(12) United States Patent
Wang

(10) Patent No.: US 11,989,814 B2
(45) Date of Patent: May 21, 2024

(54) IMAGE PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Kai Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 143 days.

(21) Appl. No.: 17/718,318

(22) Filed: Apr. 12, 2022

(65) Prior Publication Data

US 2022/0237848 A1    Jul. 28, 2022

Related U.S. Application Data

(63) Continuation of application No. PCT/CN2020/125078, filed on Oct. 30, 2020.

(30) Foreign Application Priority Data

Jan. 10, 2020    (CN) .......................... 202010028338.3

(51) Int. Cl.
*G06T 7/20* (2017.01)
*A63F 13/52* (2014.01)
(Continued)

(52) U.S. Cl.
CPC .............. *G06T 13/80* (2013.01); *A63F 13/52* (2014.09); *G06T 7/246* (2017.01); *G06T 2207/10016* (2013.01)

(58) Field of Classification Search
CPC ......... G06T 2207/10016; G06T 3/4007; G06T 7/20; G09G 2320/0261; G09G 2320/106;
(Continued)

(56) References Cited

U.S. PATENT DOCUMENTS 6,442,203 B1 * 8/2002 Demos ................... H04N 7/014
                                                    348/E7.013
8,922,712 B1 * 12/2014 Namboodiri ............. G09G 5/39
                                                    348/700
(Continued)

FOREIGN PATENT DOCUMENTS

CN    105100692 A    11/2015
CN    105120337 A    12/2015
(Continued)

OTHER PUBLICATIONS

The World Intellectual Property Organization (WIPO) International Search Report for PCT/CN2020/125078 dated Jan. 29, 2021 6 Pages (including translation).
(Continued)

*Primary Examiner* — Hau H Nguyen
(74) *Attorney, Agent, or Firm* — ANOVA LAW GROUP, PLLC

(57) ABSTRACT

Embodiments of this application provide an image processing method and apparatus, an electronic device, and a storage medium. The method includes: acquiring a first sequence of images and motion vector data corresponding to each frame of image in the first sequence of images; generating, based on the motion vector data, the first sequence of images, and a slowdown multiple, an insertion image that correspondences to the slowdown multiple, a quantity of insertion images corresponding to the slowdown multiple; inserting the insertion image into a play sequence of the first sequence of images to obtain a second sequence of images; and playing the second sequence of images.

20 Claims, 18 Drawing Sheets

(51) Int. Cl.
*G06T 7/246* (2017.01)
*G06T 13/80* (2011.01)

(58) Field of Classification Search
CPC ........... G09G 2340/0435; H04N 7/014; H04N 19/51; H04N 23/951; H04N 5/145; H04N 5/783
See application file for complete search history.

(56) References Cited

U.S. PATENT DOCUMENTS

| | | | |
|---|---|---|---|
| 9,560,308 B2 | 1/2017 | Moguillansky | |
| 10,212,386 B2 | 2/2019 | Liu et al. | |
| 11,394,996 B2 | 7/2022 | Chen et al. | |
| 2015/0071605 A1* | 3/2015 | Ogawa | H04N 5/775 386/241 |

FOREIGN PATENT DOCUMENTS

| | | |
|---|---|---|
| CN | 109803175 A | 5/2019 |
| CN | 110121114 A | 8/2019 |
| CN | 110460907 A | 11/2019 |
| CN | 111260760 A | 6/2020 |
| WO | 2013112517 A1 | 8/2013 |
| WO | 2019191867 A1 | 10/2019 |

OTHER PUBLICATIONS

China National Intellectual Property Administration (CNIPA) Office Action 1 for 202010028338.3 dated Feb. 2, 2023 17 Pages (including translation).

Deng et al. "Novelmotion vector processing method for frame rate up conversion", Journal of Image and Graphics, vol. 16, Issue 02, Feb. 16, 2011 (Feb. 16, 2011).

* cited by examiner

First location  Second location  Third location  Fourth location

One frame of image in a sequence of images

Map

IMAGE PROCESSING METHOD AND APPARATUS, ELECTRONIC DEVICE, AND STORAGE MEDIUM

RELATED APPLICATIONS

This application is a continuation application of PCT Application No. PCT/CN2020/125078, filed on Oct. 30, 2020, which claims priority to Chinese Patent Application No. 202010028338.3 entitled "IMAGE PROCESSING METHOD AND APPARATUS, ELECTRONIC DEVICE, AND STORAGE MEDIUM," and filed on Jan. 10, 2020. The two applications are both incorporated by reference in their entirety.

FIELD OF THE TECHNOLOGY

This application relates to the field of image processing technologies, and to an image processing method and apparatus, an electronic device, and a storage medium.

BACKGROUND OF THE DISCLOSURE

With increasingly high requirements of game users, more video games are developed following the trend of increasingly high-definition picture performance and more realistic light and shadow performance.

However, in a related dynamic effect display process, to improve dynamic effect performance capability, more picture content needs to be created in advance by using a development tool, resulting in high production costs. Because the picture content needs to be developed, development difficulty is increased, and development efficiency is reduced.

SUMMARY

Embodiments of the present disclosure provide an image processing method. The method includes: acquiring a first sequence of images and motion vector data corresponding to each frame of image in the first sequence of images; generating, based on the motion vector data, the first sequence of images, and a slowdown multiple, an insertion image that matches the slowdown multiple, a quantity of insertion images corresponding to the slowdown multiple; inserting the insertion image into a play sequence of the first sequence of images to obtain a second sequence of images; and playing the second sequence of images.

Embodiments of the present disclosure provide an image processing apparatus. The apparatus includes: a data acquiring unit, configured to acquire a first sequence of images and motion vector data corresponding to each frame of image in the first sequence of images; an image generation unit, configured to generate, based on the motion vector data, the first sequence of images, and a slowdown multiple, an insertion image that matches the slowdown multiple, a quantity of insertion images corresponding to the slowdown multiple; an image configuration unit, configured to insert the insertion image into a play sequence of the first sequence of images to obtain a second sequence of images; and an image play unit, configured to play the second sequence of images.

Embodiments of the present disclosure provide an electronic device, including a processor and a memory; one or more programs being stored in the memory and configured to be executed by the processor to implement the foregoing method.

Embodiments of the present disclosure provide a non-transitory computer-readable storage medium, storing program code, when run by a processor, performing the foregoing method.

According to the image processing method and apparatus, the electronic device, and the storage medium provided in this application, an insertion image that corresponds to a slowdown multiple is generated based on motion vector data, a first sequence of images, and the slowdown multiple, and is inserted into a play sequence of the first sequence of images, thereby implementing dynamic generation of the insertion image based on the slowdown multiple and the motion vector data, reducing production costs and shortening time for dynamic effect production, and improving development efficiency.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by persons of ordinary skill in the art based on the embodiments of this application without creative efforts shall fall within the protection scope of this application.

Before the embodiments of this application are further described in detail, a description is made on nouns and terms involved in the embodiments of this application, and the nouns and terms involved in the embodiments of this application are applicable to the following explanations.

Slowdown multiple: represents a multiple of extending play duration of a dynamic effect. For example, if the slowdown multiple is 2, it indicates that the play duration of the dynamic effect needs to be extended by two times. For example, if original play duration of the dynamic effect is 2 seconds, when the slowdown multiple is 2, the play duration is correspondingly extended to 4 seconds, and when the slowdown multiple is 5, the corresponding play duration is extended to 10 seconds.

Motion vector: represents a displacement of a target pixel in an image. The target pixel may be any pixel in the image, or may be a pixel in a content block in the image.

Figure 1:
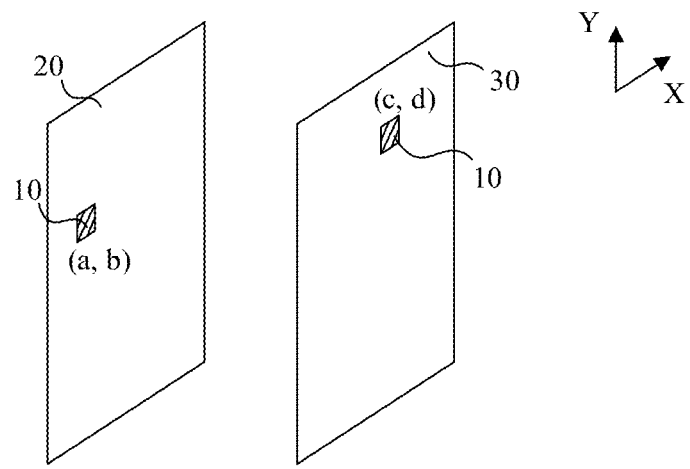
FIG. 1 is a schematic diagram of a motion vector according to an embodiment of this application.

As shown in FIG. 1, if a target pixel is a pixel in an image, and it is assumed that a pixel 10 is the target pixel, a location of the pixel 10 in an image 20 of a previous frame in FIG. 1 is (a, b), and a location of the pixel 10 in an image 30 of a next frame is (c, d), a motion vector corresponding to the pixel 10 in the image of the next frame is (dx, dy), where dx represents a displacement of the pixel 10 in an X axis direction, and dy represents a displacement of the pixel 10 in a Y axis direction. Therefore, in the case shown in FIG. 1, dx=a−c, and dy=d−b.

Figure 2:
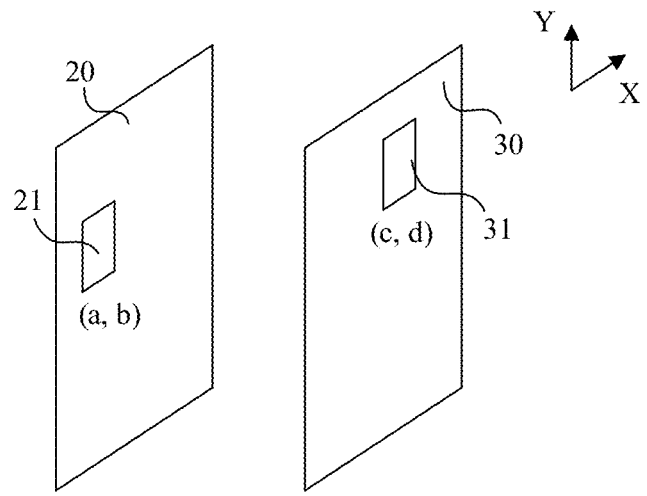
FIG. 2 is a schematic diagram of a motion vector according to an embodiment of this application.

As shown in FIG. 2, if a target pixel is a pixel in a content block, a motion vector represents a displacement between the content block and a best match block, and the best match block refers to a content block 31 in a next frame of image 30 that has a highest matching degree with a content block 21 of a previous frame of image 20. The content block may include multiple pixels. In this embodiment, a pixel displacement of a central point of the content block may be used as a displacement of the content block. The central point may be a geometric center. In content shown in FIG. 2, a pixel location of a central point of the content block 21 is (a, b), and a pixel location of a central point of the best match block 31 is (c, d), so that a motion vector between the content block and the best match block is (a−c, d−b).

The content block may be understood as representing an area with an entity meaning in the image. For example, if the image contains a person, the head of the person is an area with an entity meaning, and the entity meaning is that image content of the area represents the head of the person, so that the header area may be used as a content block. For another example, a hand of the person is also an area with an entity meaning, and the hand area may be used as a content block.

The target pixel in this embodiment may be understood as each pixel in the image, or may be understood as a pixel in the content block in the foregoing content. Motion vector data involved in this embodiment represents data that carries a motion vector, and the data may be in a text format or a picture format.

As a user has an increasingly high requirement for visual experience, image display of a virtual scene develops in a direction of clearer and more realistic. For example, in a video game scene, a variety of game characters and game special effects are displayed more visually.

High production costs are required for a dynamic effect involved in some virtual scenes. For example, a key frame is produced, or a sequence of images needs to be produced to implement a required dynamic effect.

Regarding the key frame, the key frame is equivalent to an original picture in a dynamic effect, and refers to a frame in which a key action in motion or change of an object is located. Regarding the sequence of images, a dynamic effect to be displayed is decomposed, and the dynamic effect is further decomposed into multiple actions. Each action may be used as one frame of image, and then images corresponding to one action are combined into a sequence of images. In a process of playing the sequence of images, a dynamic effect corresponding to the sequence of images can be displayed.

However, to implement the required dynamic effect, a developer needs to produce each frame of image in the dynamic effect by using a development tool in an earlier stage, thereby causing high production costs. For example, a dynamic effect of a super slow action type has a higher frame rate (the quantity of frames displayed per second) than a dynamic effect of an ordinary action type. For example, the frame rate of the dynamic effect of the ordinary action type is 30 fps, and the frame rate of the dynamic effect of the super slow action type may be 240 fps or even higher. 30 fps represents that 30 frames of images are played per second, and 240 fps represents that 240 frames of images are played per second. When an initial dynamic effect is a dynamic effect of a common type, and a dynamic effect of a super slow action type needs to be implemented by slowing down based on the dynamic effect of the common type, a developer needs to produce more images and insert them into an image sequence of the common dynamic effect, so as to adapt to an increase in a frame rate.

In addition, if an adjustment (for example, an adjustment of play duration) needs to be performed on a dynamic effect that has been completed, a problem of reproduction is involved, and production costs are further increased. For example, when play duration is 2 seconds and a dynamic effect of 60 frames of images is included, if play needs to be slowed down by 5 times (which may be understood as extending play duration by 5 times), and an original visual effect needs to be maintained, a total of 300 frames of images are required, which means that 240 frames of images need to be reproduced, thereby causing large production costs.

In addition, an image produced in advance is stored in a resource file. After the resource file is stored in a terminal device used by a user, the resource file occupies more storage space of the terminal device, and utilization of storage space is reduced.

Using the image processing method and apparatus, the electronic device, and the computer-readable storage medium that are provided in the embodiments of this application, after an original sequence of images has been obtained by using a development tool, when a dynamic effect represented by the original sequence of images needs to be slowed down, and a visual effect needs to be maintained or a better visual effect needs to be obtained, an insertion image may be obtained by using motion vector data corresponding to each frame of image in the original sequence of images obtained during production, and inserted into a play sequence of the original sequence of images, so as to obtain a sequence of images including more images and dynamically generate an insertion image according to a slowdown multiple and motion vector data. In addition, the development tool no longer needs to be used for producing more images for insertion into the original sequence of images, thereby reducing production costs and shortening production time of the dynamic effect.

The image processing method provided in the embodiments of this application may be implemented by a terminal/server alone; or may be implemented by the terminal and the server through cooperation. For example, when collecting a request for slowing down play of a first sequence of images (including a slowdown multiple), the terminal independently undertakes the image processing method described below to obtain a second sequence of images and play the second sequence of images. The terminal collects a request for slowing down play of a first sequence of images (including a slowdown multiple), and sends the request to the server. After receiving the request, the server performs the image processing method to obtain a second sequence of images, and sends the second sequence of images to the terminal, so as to play the second sequence of images.

The electronic device provided by the embodiments of this application for implementing the image processing method described below may be various types of terminal devices or servers. The server may be an independent physical server, or may be a server cluster or a distributed system including a plurality of physical servers, or may be a cloud server that provides cloud computing services. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited by the description of this application.

The following further describes the solution principles involved in the embodiments of this application.

Figure 3:
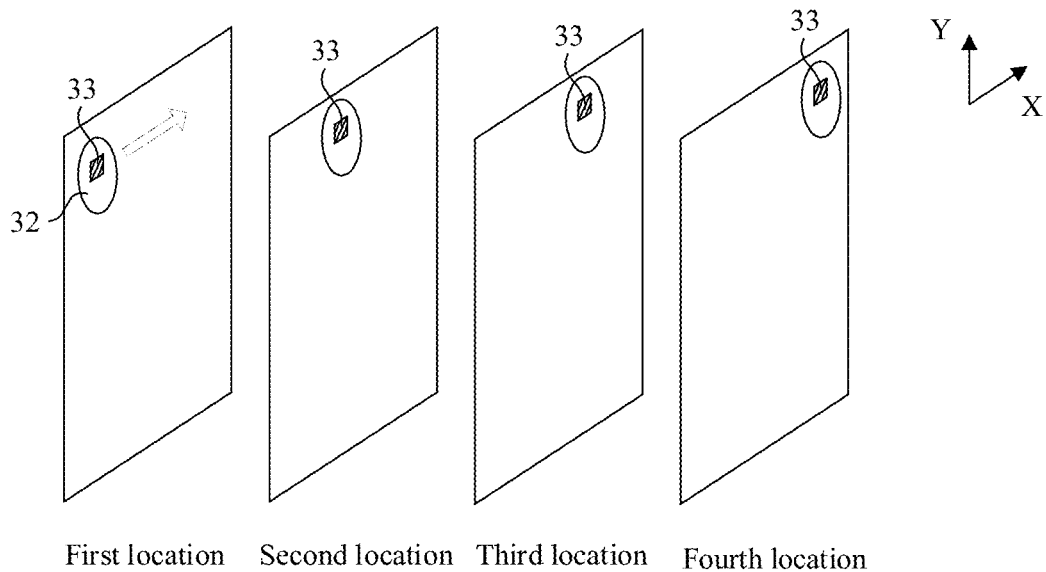
FIG. 3 is a schematic diagram of object movement according to an embodiment of this application.

As shown in FIG. 3, a process in which an object moves from one end of a picture to another end is represented by using a sequence of images as an example for description. It may also be seen from FIG. 3 that an object 32 passes through multiple locations in a moving process. For example, the object 32 starts to move from a first location and reaches a fourth location after passing through a second location and a third location. A picture of the object 32 at each location may be represented by using one frame of image, which may be further understood as that each frame of image in the sequence of images represents one location of the object. For example, the sequence of images includes four frames of images, where the first frame of image corresponds to a picture at the first location, the second frame of image corresponds to a picture at the second location, the third frame of image corresponds to a picture at the third location, and the fourth frame of image corresponds to a picture at the fourth location.

In this case, a pixel that represents the object in each frame of image may be used as a target pixel. Therefore, in the moving process, the object in each frame of image may be considered as the target pixel in each frame of image. For example, a target pixel 33 (a pixel representing the object 32) in FIG. 3 is used as an example. In the moving process of the object 32 from the first location to the fourth location, it may be considered that the target pixel 33 moves from the first location to the fourth location.

In this embodiment, by using the foregoing features, a new image may be generated as an insertion image by acquiring a motion vector of a target pixel, so as to resolve the foregoing technical problem.

The following describes the embodiments of this application in detail with reference to the accompanying drawings.

Figure 4:
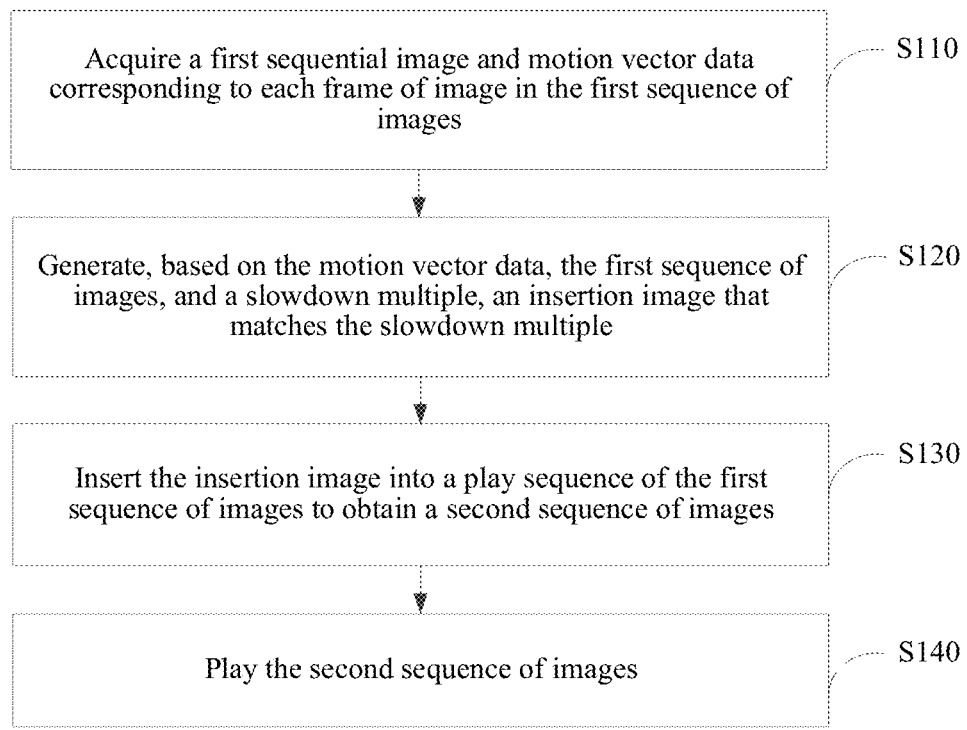
FIG. 4 is a flowchart of an image processing method according to an embodiment of this application.

FIG. 4 is a flowchart of an image processing method according to an embodiment of this application. The method includes the following steps:

S110. Acquire a first sequence of images and motion vector data corresponding to each frame of image in the first sequence of images.

In this embodiment, the first sequence of images may be understood as a sequence of images that represents a target dynamic effect. The first sequence of images may include multiple frames of images. When the multiple frames of images are drawn to an image display interface for display, the target dynamic effect may be displayed on the image display interface. In this embodiment, the first sequence of images is a basis for subsequently generating a new image. In one example, the first sequence of images may be obtained by a developer by using a development tool.

Motion vector data corresponding to each frame of image in the first sequence of images represents a displacement of a target pixel in a corresponding image with respect to a corresponding pixel in an adjacent image, or a displacement of a content block in a corresponding image with respect to a best match block in an adjacent image. The adjacent image may be a previous frame of image adjacent to the corresponding image, or may be a next frame of image adjacent to the corresponding image.

For example, if the first sequence of images includes a first frame of image, a second frame of image, a third frame of image, and a fourth frame of image, when the motion vector data represents the displacement of the target pixel in each frame of image with respect to the corresponding pixel in the previous frame of image, the motion vector data corresponding to the first frame of image is all 0, because the target pixel in the first frame of image is not moved yet, and no displacement is generated. Motion vector data corresponding to the second frame of image may represent a displacement of a location of the target pixel in the second frame of image with respect to a location of a corresponding pixel in the first frame of image. Similarly, motion vector data corresponding to the third frame of image may represent a displacement of a location of the target pixel in the third frame of image with respect to a location of a corresponding pixel in the second frame of image, and motion vector data corresponding to the fourth frame of image may represent a displacement of a location of the target pixel in the fourth frame of image with respect to a location of a corresponding pixel in the third frame of image.

S120. Generate, based on the motion vector data, the first sequence of images, and a slowdown multiple, an insertion image that matches the slowdown multiple. A quantity of insertion images corresponds to the slowdown multiple.

As is known from the foregoing content, the first sequence of images may represent a dynamic effect in a display process. In this embodiment, the slowdown multiple may be understood as a multiple of slowing down the dynamic effect represented by the first sequence of images, or may be understood as a multiple of extending play duration of the dynamic effect represented by the first sequence of images.

For example, if the play duration of the dynamic effect represented by the first sequence of images in the display process is 2 seconds, when the slowdown multiple is 2, the dynamic effect represented by the first sequence of images needs to be slowed down by 2 times, that is, the play duration is extended from 2 seconds to 2×2=4 seconds. For another example, if the play duration of the dynamic effect represented by the first sequence of images in the display process is 4 seconds, when the slowdown multiple is 3, the dynamic effect represented by the first sequence of images needs to be slowed down by 3 times, that is, the play duration of the dynamic effect is extended from 4 seconds to 4×3=12 seconds.

In the play process of the dynamic effect, a frame rate is a factor that affects user visual experience. The frame rate may be understood as the quantity of frames of images played per second, or may be understood as the quantity of frames of images refreshed per second. A smooth and vivid animation may be obtained with a high frame rate. When the play duration of the dynamic effect represented by the first sequence of images is extended, if the quantity of frames of images in the first sequence of images is not increased at the same time, the quantity of frames played per second is reduced, thereby causing a sense of lag.

For example, if a total of 60 frames of images are included in the original first sequence of images, and the play duration is 2 seconds, a corresponding frame rate is 30 fps (the quantity of frames displayed per second). When the slowdown multiple is 4, the corresponding play duration is extended to 8 seconds, and when no new image is inserted, the corresponding frame rate becomes 7.5 fps. Therefore, to achieve a technical effect that the first sequence of images can still maintain the visual effect while being slowed down to play, a new image may be generated as an insertion image based on the motion vector data, the first sequence of images, and the slowdown multiple, and the insertion image is inserted into the first sequence of images.

In one example, in a process of generating the insertion image, motion vector data of the to-be-generated insertion image may be first acquired as reference motion vector data. It may be understood that the reference motion vector data represents a displacement of the target pixel in a corresponding image with respect to a frame of image in the first sequence of images, or represents a displacement of the target pixel in a corresponding image with respect to an insertion image generated first. Therefore, after the reference motion vector data is generated, the target pixel may be moved according to the generated reference motion vector data, so as to generate the insertion image.

For a different slowdown multiple, extended play duration corresponding to the dynamic effect is different, and the quantity of insertion images to be generated and to be inserted into the first sequence of images is also different. Therefore, the quantity of generated insertion images needs to match the slowdown multiple, so as to correspond to the different slowdown multiple. As such, the original visual effect can be maintained, and even the original visual effect can be improved.

S130. Insert the insertion image into a play sequence of the first sequence of images to obtain a second sequence of images.

After the insertion image is generated, a play location corresponding to each insertion image may be configured. Inserting the insertion image into the play sequence of the first sequence of images may be understood as configuring the play location corresponding to each insertion image in the play sequence of the original first sequence of images, so as to obtain the second sequence of images. It may be understood that, in this embodiment, each play location represents a time sequence location that is played in the play sequence. For example, if the play location corresponding to the insertion image is between the first frame of image and the second frame of image in the first sequence of images, it means that in a subsequent display process, the first frame of image is played first, then the insertion image is played, and then the second frame of image is played.

Figure 5:
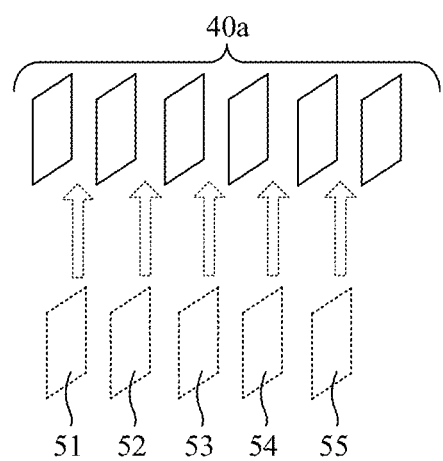
FIG. 5 is a schematic diagram of inserting an insertion image into a play sequence in the embodiment shown in FIG. 4.
Figure 6:
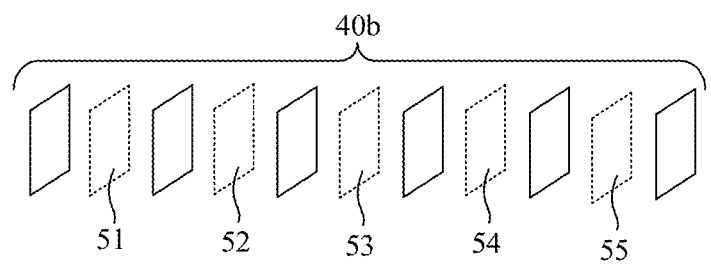
FIG. 6 is a schematic diagram of a second sequence of images in the embodiment shown in FIG. 4.

For example, as shown in FIG. 5, that a first sequence of images 40a includes six frames of images is used as an example. When there are six frames of images, one frame of image may be separately inserted between every two adjacent frames of images, that is, a total of five frames of images may be inserted. It is assumed that the five frames of insertion images generated corresponding to the first sequence of images 40a include an insertion image 51, an insertion image 52, an insertion image 53, an insertion image 54, and an insertion image 55. In addition, an insertion location corresponding to each insertion image is a location indicated by a corresponding arrow, that is, a time sequence location that is subsequently played in the play sequence. Further, the obtained second sequence of images may be shown in FIG. 6. In FIG. 6, the insertion image 51, the insertion image 52, the insertion image 53, the insertion image 54, and the insertion image 55 shown in FIG. 5 are already inserted into the generated second sequence of images 40b.

S140. Play the second sequence of images.

If the generated second sequence of images includes multiple frames of images, playing the second sequence of images may be understood as sequentially playing the multiple frames of images included in the second sequence of images, so as to implement a dynamic effect represented by playing of the second sequence of images. For example, in the second sequence of images 40b shown in FIG. 6, when the insertion image 51, the insertion image 52, the insertion image 53, the insertion image 54, and the insertion image 55 are inserted into the original first sequence of images 40a, and the second sequence of images 40b is played, the images in the second sequence of images 40b are played in sequence from left to right, so as to display the corresponding dynamic effect.

According to the image processing method provided in this embodiment, after the first sequence of images and the motion vector data are acquired, the insertion image whose quantity matches the slowdown multiple is generated based on the motion vector data, the first sequence of images, and the slowdown multiple, and the insertion image is inserted into the play sequence of the first sequence of images to obtain the second sequence of images. Therefore, after the first sequence of images is produced, when the dynamic effect represented by the first sequence of images needs to be slowed down and the visual effect needs to be maintained, the insertion image is produced according to the motion vector data corresponding to each frame of image in the first sequence of images, and inserted into the play sequence of the first sequence of images, so as to obtain the second sequence of images that includes more images. In this way, a development tool is not required to be used for producing more images to be inserted into the first sequence of images, so as to reduce production costs and shorten time for producing the dynamic effect.

Figure 7:
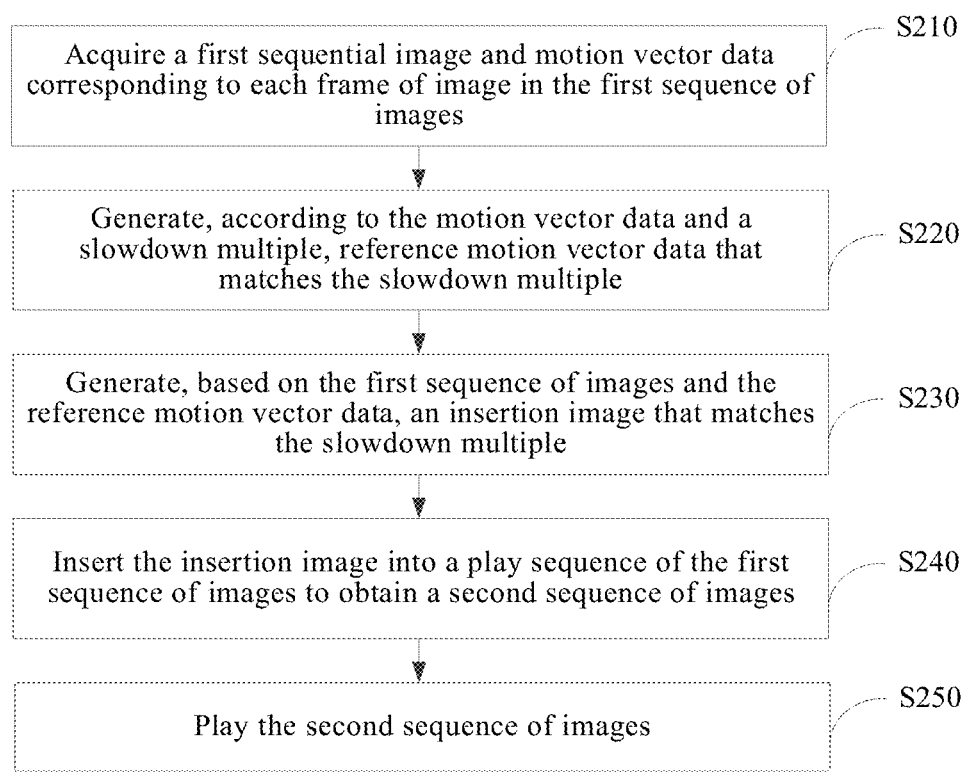
FIG. 7 is a flowchart of an image processing method according to an embodiment of this application.

FIG. 7 is a flowchart of an image processing method according to an embodiment of this application. The method includes the following steps:

S210. Acquire a first sequence of images and motion vector data corresponding to each frame of image in the first sequence of images.

S220. Generate, according to the motion vector data and a slowdown multiple, reference motion vector data that matches the slowdown multiple. A quantity of reference motion vector data corresponds to the slowdown multiple.

The reference motion vector data refers to motion vector data corresponding to an insertion image, and may be generated according to the motion vector data and the slowdown multiple that are corresponding to each frame of image in the first sequence of images, and then subsequently, the insertion image is generated according to the reference motion vector data.

In this embodiment, the reference motion vector data that matches the slowdown multiple may be generated in multiple ways. Each piece of reference motion vector data corresponds to one insertion image, that is, the quantity of reference motion vector data corresponds to the quantity of subsequently generated insertion images.

Figure 8:
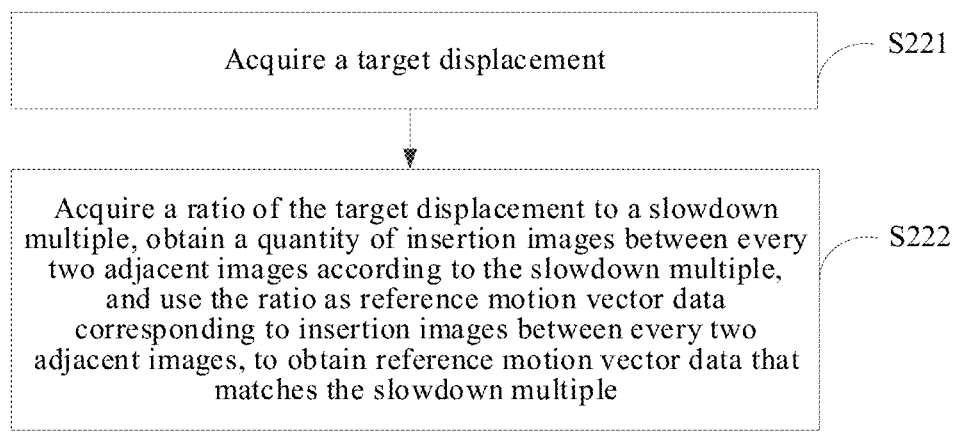
FIG. 8 is a flowchart of an implementation of S220 in the image processing method provided in FIG. 7.

As shown in FIG. 8, the generating, according to the motion vector data and a slowdown multiple, reference motion vector data that matches the slowdown multiple may include:

S221. Acquire a target displacement, where the target displacement is a displacement represented by motion vector data corresponding to a later displayed image in every two adjacent images in the first sequence of images.

S222. Acquire a ratio of the target displacement to the slowdown multiple, obtain a quantity of insertion images between every two adjacent images according to the slowdown multiple, and use the ratio as reference motion vector data corresponding to the insertion images between every two adjacent images, to obtain the reference motion vector data that matches the slowdown multiple.

It is assumed that images included in the first sequence of images are a first frame of image, a second frame of image, a third frame of image, a fourth frame of image, a fifth frame of image, and a sixth frame of image, and the reference motion vector data may be generated by using every two adjacent images as one interval. In this embodiment, one target displacement may be generated for each interval, and is used as a target displacement corresponding to the interval.

For example, the first frame of image and the second frame of image may be used as an interval, the second frame of image and the third frame of image are used as an interval, the third frame of image and the fourth frame of image are used as an interval, the fourth frame of image and the fifth frame of image are used as an interval, and the fifth frame of image and the sixth frame of image are used as an interval. In the interval including the first frame of image and the second frame of image, a later displayed image is the second frame of image, and a target displacement corresponding to the interval is a displacement represented by motion vector data corresponding to the second frame of image. It may be understood that motion vector data corresponding to each frame of image represents a displacement of a target pixel in each frame of image, and the target displacement includes a displacement of each pixel in the target pixel.

In this case, assuming that a location of a first pixel included in the target pixel in the first frame of image is (a1, b1), and a location of the first pixel in the second frame of image is (a2, b2), a motion vector of the first pixel in motion vector data corresponding to the second frame of image is (a2−a1, b2−b1), a displacement of the first pixel in an X axis direction is a2−a1, a displacement of the first pixel in a Y axis direction is b2−b1, and the finally calculated target displacement includes the displacement a2−a1 of the first pixel in the X axis direction and the displacement b2−b1 of the first pixel in the Y axis direction. Therefore, the displacement of each pixel included in the target pixel may be acquired in the foregoing manner, so that the displacement represented by the motion vector corresponding to the second frame of image is used as the target displacement corresponding to the interval. For example, assuming that the target pixel further includes a second pixel, and a location of the second pixel in the first frame of image is (c1, d1), and a location of the second pixel in the second frame of image is (c2, d2), for the second pixel, a displacement in the X axis is c2−c1, and a displacement in the Y axis is d2−d1. In this case, the calculated target displacement includes the displacement a2−a1 of the first pixel in the X axis, the displacement b2−b1 of the first pixel in the Y axis, the displacement c2−c1 of the second pixel in the X axis, and the displacement d2−d1 of the second pixel in the Y axis.

Movement of each pixel in the first sequence of images is of a certain integrity. Referring to FIG. 3, in the moving process of the object 32 from the first location to the fourth location, except the pixel 33, all pixels constituting the object 32 may be considered as moving together from the first location to the fourth location. In such a process from the first location to the fourth location, a displacement of each pixel constituting the object 32 is the same. Therefore, a displacement of a pixel in the target pixel in the later displayed image may be directly used as the displacement represented by the motion vector data corresponding to the later displayed image, so as to obtain the target displacement corresponding to each interval.

For example, the target pixel that includes the first pixel and the second pixel is used as an example, and the target pixel is a target pixel of the first frame of image and the second frame of image. The calculated target displacement includes the displacement a2−a1 of the first pixel in the X axis direction, the displacement b2−b1 of the first pixel in the Y axis direction, the displacement c2−c1 of the second pixel in the X axis direction, and the displacement d2−d1 of the second pixel in the Y axis direction. When the movement is of certain integrity, c2−c1 and a2−a1 are the same, and d2−d1 and b2−b1 are the same, so that the target displacement corresponding to the interval including the first frame of image and the second frame of image is a2−a1 (X axis direction) and b2−b1 (Y axis direction).

As shown in the foregoing content, the quantity of images inserted in every two adjacent images is related to a current slowdown multiple. In one example, a larger slowdown multiple corresponding to the play duration of the dynamic effect represented by the first sequence of images indicates that the play duration of the dynamic effect is longer, and further more insertion images need to be generated.

In this embodiment, after the target displacement corresponding to each interval is obtained, reference motion vector data corresponding to the to-be-generated insertion image may be determined according to the ratio of the target displacement to the slowdown multiple. In one example, the target displacement may include a displacement of each pixel in the target pixel between every two adjacent images. When the target displacement is compared with the slowdown multiple to calculate the ratio, the displacement of each pixel included in each target displacement needs to be separately compared with the slowdown multiple to calculate reference motion vector data corresponding to each pixel in the insertion image, so as to obtain reference motion vector data corresponding to the insertion image.

Figure 9:
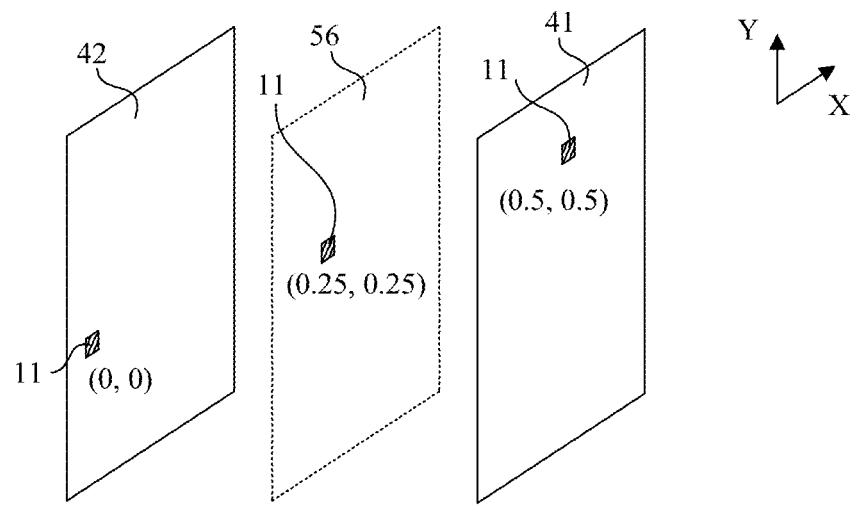
FIG. 9 is a schematic diagram of reference motion vector data according to an embodiment of this application.

For example, as shown in FIG. 9, if a motion vector of a pixel 11 included in a target pixel in a current frame of image 41 is (0.5, 0.5), the motion vector represents that a replacement of a location of the pixel 11 in the current frame of image 41 is 0.5 with respect to a location of the pixel 11 in a previous frame of image 42 in both an X axis direction and a Y axis direction. When the slowdown multiple is 2, the obtained ratio is 0.5/2=0.25, and then the ratio 0.25 is used as reference motion vector data of the pixel 11 in the target pixel included in the to-be-generated insertion image. For example, if the to-be-generated insertion image is an insertion image 56, when the ratio 0.25 is obtained by means of calculation, it may be determined that a displacement of a pixel 11 in the insertion image 56 is 0.25 with respect to a displacement of the pixel 11 in a previous frame of image 42 in the X axis direction and the Y axis direction.

After the ratio is acquired, the quantity of reference motion vector data that needs to be generated in each interval may be determined according to a formula in which x×N is less than y. The symbol "×" represents a product operation, where x is the ratio of the target displacement to the slowdown multiple, y is the target displacement, and N is the maximum integer such that x×N is less than y.

Using the foregoing movement of the pixel 11 in the X axis direction as an example, the displacement of the pixel 11 in the X axis direction is 0.5, that is, the displacement represented by the motion vector data corresponding to the later displayed image is 0.5, and the target displacement 0.5 is obtained. Because the corresponding slowdown multiple is 2, in this case, the ratio is 0.25. Based on the formula in which x×N is less than y, and N is the maximum integer such that x×N is less than y, N is 1. That is, one piece of reference motion vector data needs to be generated in this interval. In this case, if the first sequence of images includes six frames of images, (6−1)×1=5 pieces of reference motion vector data need to be generated in total.

For another example, if the obtained target displacement is still 0.5, but the corresponding slowdown multiple is 3, the ratio is 0.16. Based on the formula in which x×N is less than y, and N is the maximum integer such that x×N is less than y, N is 3. That is, three pieces of reference motion vector data need to be generated in this interval. In this case, if the first sequence of images includes six frames of images, (6−1)×3=15 pieces of reference motion vector data need to be generated in total, and if the first sequence of images includes nine frames of images, (9−1)×3=24 pieces of reference motion vector data need to be generated in total.

In addition, in another method of generating the reference motion vector data whose quantity matches the slowdown multiple, the quantity of the to-be-newly-generated reference motion vector data may be directly determined according to the original quantity of frames of the first sequence of images. Accordingly, if the quantity of the original frames of the first sequence of images is m, when it is determined that the slowdown multiple is n, a new sequence of images that is to be subsequently generated has a total of m×n frames of images, and a total quantity of m×n−m frames of insertion images need to be generated. In this case, the quantity of reference motion vector data that needs to be generated is m×n−m, and the quantity of insertion images that need to be generated between every two adjacent frames of images may be (m×n−m)/(m−1).

In some cases, an integer cannot be obtained from (m×n−m)/(m−1). To improve this case, when it is detected that (m×n−m)/(m−1) is not an integer, the quotient of (m×n−m)/(m−1) may be used as the quantity of insertion images that need to be generated between two adjacent frames of images, and the obtained remainder is randomly inserted between any two frames of images in the first sequence of images, or is inserted for display after the last frame of image in the first sequence of images.

For example, if the first sequence of images includes six frames of images, when the slowdown multiple is 2, 6×2−6=6 frames of images need to be newly generated in total through calculation. In addition, 6/5 is further detected as not an integer, the quotient is 1 through adaptive calculation, so that it is determined that in the six frames of images, the quantity of insertion images that need to be generated between every two adjacent frames of images is one frame, and the remaining one frame of image may be configured between any two of the six frames of images of the first sequence of images, or may be configured for generation after the original six frames of images. For example, if the original six frames of images include a first frame of image, a second frame of image, a third frame of image, a fourth frame of image, a fifth frame of image, and a sixth frame of image, when it is determined to configure the remaining one frame of image to be generated between the first frame of image and the second frame of image, insertion images to be generated between the first frame of image and the second frame of image are two frames, and an insertion image to be generated between the other two adjacent frames of images is one frame.

Accordingly, after the quantity of insertion images to be generated between every two adjacent images is determined, reference motion vector data corresponding to the insertion image to be generated between every two adjacent images may still be determined in the foregoing manner.

In addition, the motion vector data corresponding to each frame of image in the first sequence of images may be stored in multiple ways.

Figure 10:
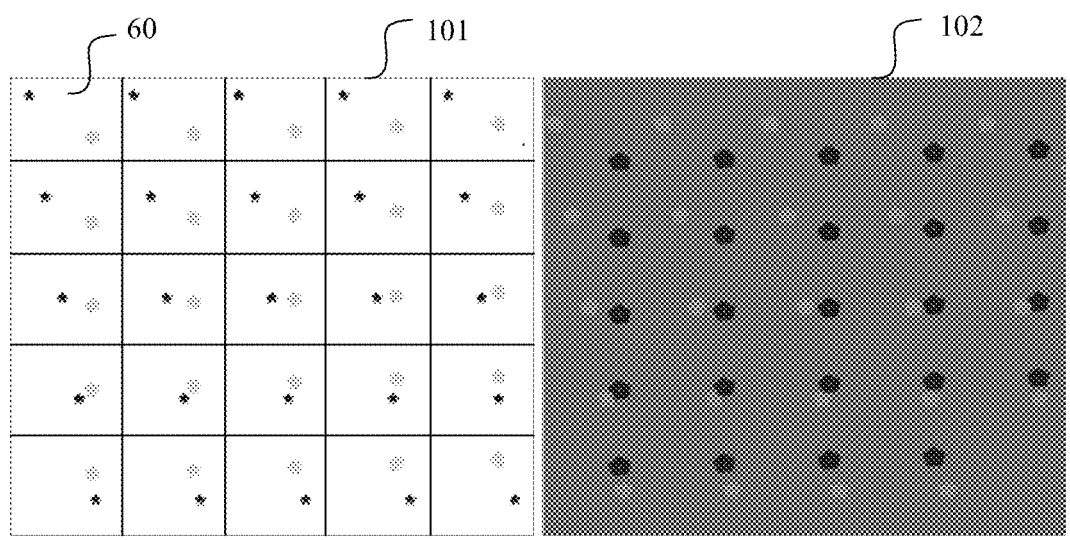
FIG. 10 is a schematic diagram of a basic image and a motion vector map according to an embodiment of this application.

In one example, the motion vector data corresponding to each frame of image may be stored in a data table. In another example, the motion vector data corresponding to each frame of image may be carried by making a map. The map is an image that has the same contour as an image in the sequence of images. For example, in FIG. 10, a left image 101 is a basic image including a sequence of images, a right image 102 is a corresponding map, and an object in the map has the same contour as an object in the sequence of images. The basic image includes image content corresponding to each of multiple actions when a dynamic effect to be achieved is decomposed into the multiple actions. One block 60 in FIG. 10 is corresponding to one action in the dynamic effect. In this case, when a sequence of images is generated based on the basic image in FIG. 10, one block 60 may be corresponding to one frame of image in the sequence of images.

The basic image in FIG. 10 represents a dynamic effect that one smaller star moves from the left of the picture to the right, while another larger star moves from the bottom of the picture to the top. The first sequence of images including multiple frames of images may be obtained by cutting content in the basic image. In addition, a value of a specified color channel of each pixel in the map is used for representing a motion vector of a corresponding pixel in the first sequence of images.

Figure 11:
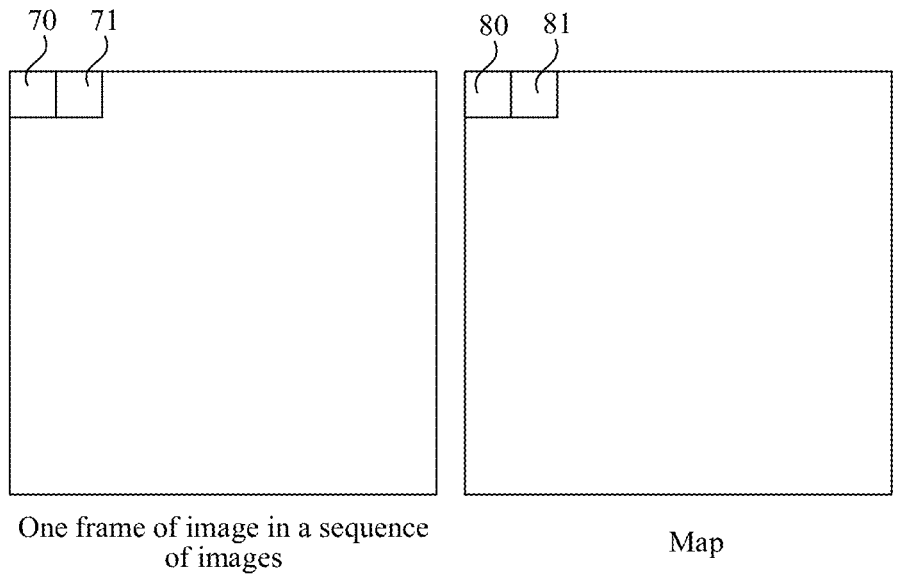
FIG. 11 is a schematic diagram corresponding to a pixel according to an embodiment of this application.

For example, as shown in FIG. 11, a pixel 70 in one frame of image in a sequence of images and a pixel 80 in a map are corresponding pixels. A value of a specified color channel corresponding to the pixel 80 is used for representing a motion vector of the pixel 70. Similarly, a pixel 71 in one frame of image in the sequence of images and a pixel 81 in the map are corresponding pixels, and a value of a specified color channel corresponding to the pixel 81 is used for representing a motion vector of the pixel 71. The specified color channel may be a red channel or a green channel, where the red channel is used for representing a displacement of the pixel in the X axis direction, and the green channel is used for representing a displacement of the pixel in the Y axis direction.

S230. Generate, based on the first sequence of images and the reference motion vector data, the insertion image that matches the slowdown multiple.

It may be understood that, in this embodiment, motion vector data corresponding to each frame of image in the first sequence of images represents a displacement of a target pixel in each frame of image with respect to a target pixel in a previous frame of image. After the reference motion vector data corresponding to the to-be-generated insertion image is determined, the insertion image may be generated based on a pixel movement method.

Figure 12:
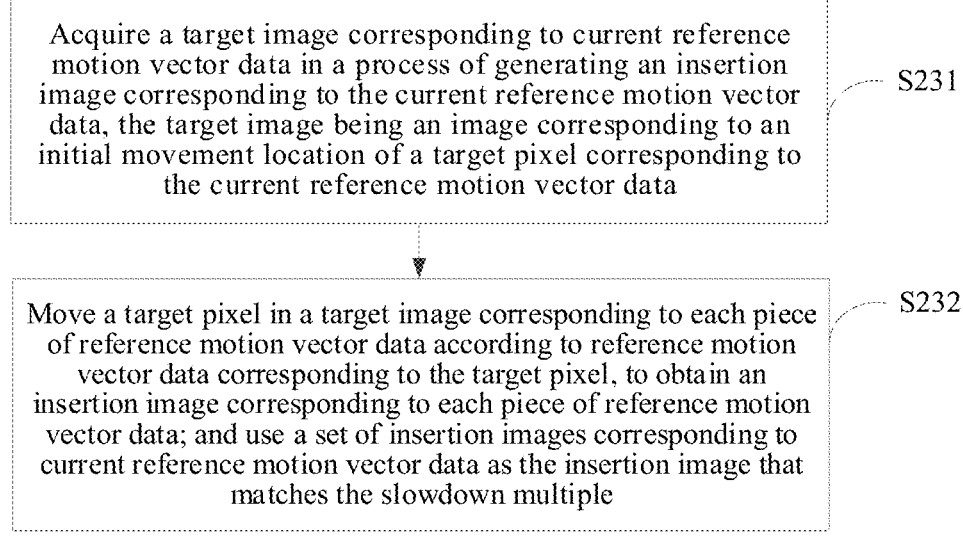
FIG. 12 is a flowchart of an implementation of S230 in the image processing method provided in FIG. 7.

As shown in FIG. 12, in one example, the generating, based on the first sequence of images and the reference motion vector data, an insertion image whose quantity matches the slowdown multiple includes:

S231. Acquire a target image corresponding to current reference motion vector data in a process of generating an insertion image corresponding to the current reference motion vector data, the target image being an image corresponding to an initial movement location of a target pixel corresponding to the current reference motion vector data.

S232. Move a target pixel in a target image corresponding to each piece of reference motion vector data according to reference motion vector data corresponding to the target pixel, to obtain an insertion image corresponding to each piece of reference motion vector data; and use a set of insertion images corresponding to current reference motion vector data as the insertion image that matches the slowdown multiple.

Figure 13:
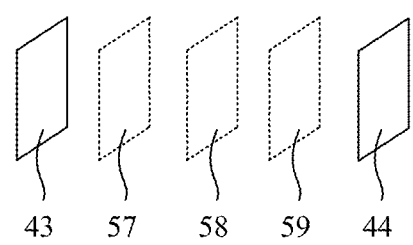
FIG. 13 is a schematic diagram of generating an insertion image from two adjacent images in an image processing method according to an embodiment of this application.

For example, as shown in FIG. 13, in content shown in FIG. 13, an image 43 and an image 44 are two adjacent frames of images that form an interval in the first sequence of images. An image 57, an image 58, and an image 59 are to-be-generated insertion images. When the image 57 is generated, reference motion vector data corresponding to the image 57 is current reference motion vector data. In addition, it may be understood that, based on the foregoing content, reference motion vector data corresponding to each of the to-be-generated images 57, 58, and 59 is determined based on a displacement represented by corresponding motion vector data of the image 44 and the slowdown multiple, and the displacement represented by the motion vector data of the image 44 is a displacement with respect to that of the image 43. In a process of generating the image 57, a target image corresponding to the reference motion vector data corresponding to the image 57 is the image 43. When a displacement represented by reference motion vector data corresponding to the image 58 is a displacement with respect to that of the image 57, and the image 58 is generated, the reference motion vector data corresponding to the image 58 is current reference motion vector data, and a target image corresponding to the current reference motion vector data is the image 57. Correspondingly, when the image 59 is generated, the target image corresponding to the current reference motion vector data is the image 58.

Figure 14:
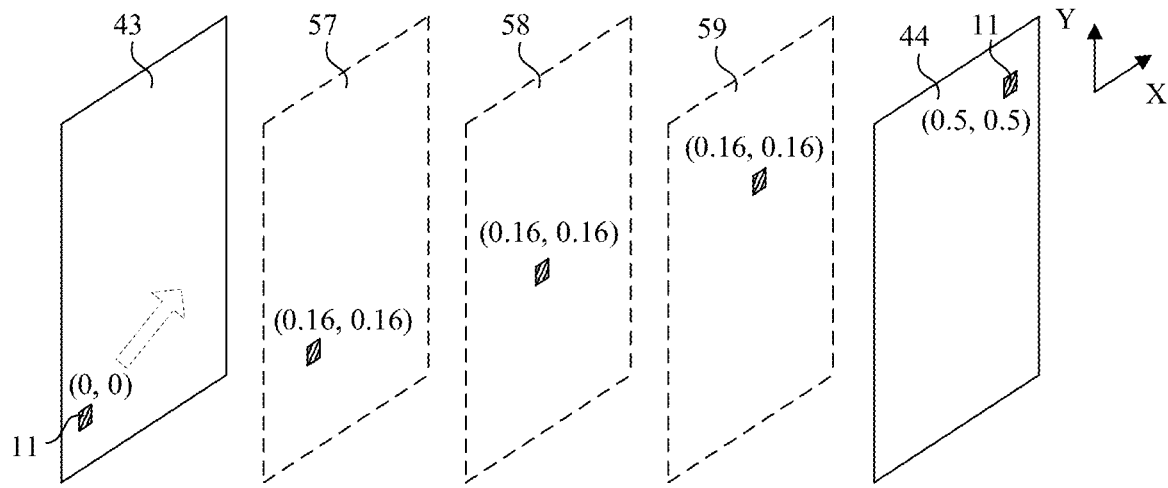
FIG. 14 is a schematic diagram of reference motion vector data corresponding to an insertion image in an image processing method according to an embodiment of this application.

In addition, in another example, after reference motion vector data is generated between every two adjacent images in the first sequence of images, a displacement of a target pixel represented by each piece of reference motion vector data with respect to the first displayed image in every two adjacent images may be determined. For example, as shown in FIG. 14, a motion vector of a pixel 11 included in a target pixel in an image 44 is (0.5, 0.5). When it is determined that a slowdown multiple is 3, it may be obtained that motion vectors corresponding to locations of the pixel 11 in an image 57, an image 58, and an image 59 all are (0.16, 0.16, 0.16). This means that a displacement of the location of the pixel 11 in the image 58 with respect to a location of the pixel 11 in an image 43 is 0.32, and a displacement of the location of the pixel 11 in the image 59 with respect to the location of the pixel 11 in the image 43 is 0.48. Correspondingly, a target image corresponding to reference motion vector data in every two adjacent images may be configured as the first displayed image in every two adjacent images.

After the target image is determined based on the foregoing manner, the insertion image may be generated by moving the pixel. For example, still referring to FIG. 14, a motion vector (0, 0) is a motion vector corresponding to the pixel 11 in an image 41. When the image 57 is generated, the pixel 11 is moved by 0.16 pixel units as indicated by an arrow in the X axis direction and the Y axis direction to obtain a location of the pixel 11 in the image 57. Accordingly, the location in the image 57 that the target pixel in the image 43 can be moved to can be obtained, and then image content corresponding to the image 57 can be generated. When the image 58 is generated, the location of the target pixel may continue to be moved based on the generated image 57, that is, the location of the target pixel may continue to be moved by 0.16 pixel units as indicated by the arrow, or the location of the target pixel may be moved by 0.32 pixel units based on the image 43, so as to generate image content corresponding to the image 58.

As shown in the foregoing content, motion vector data represents a displacement of a target pixel in an image. In this embodiment, a map having the same image content may be produced to carry motion vector data corresponding to each pixel in each frame of image. A value of a specified color channel of each pixel in the map is used for representing a motion vector of a corresponding pixel in the first sequence of images. In this case, a unit of the obtained displacement is a unit of a value of a color channel, and further, when an actual movement distance of a target pixel in an image is determined, the obtained displacement needs to be multiplied by one conversion factor to obtain a movement distance in a unit of pixel. For example, if the conversion factor is s, when a displacement of a pixel obtained through calculation is 0.25, an actual movement distance of the pixel in the image is 0.25×s pixel units. For example, in this embodiment, the conversion factor may be determined according to a bit color of the image, and a larger bit color of the image corresponds to a larger conversion factor. A bit color of an image represents the quantity of bits occupied by each color channel. For example, for a 24-bit color image, each color channel (a red channel, a green channel, and a blue channel) occupies 8 bits.

S240. Insert the insertion image into a play sequence of the first sequence of images to obtain a second sequence of images.

S250. Play the second sequence of images.

According to the image processing method provided in this embodiment, after the first sequence of images is produced, when the dynamic effect represented by the first sequence of images needs to be slowed down and the visual effect needs to be maintained, the reference motion vector data whose quantity matches the slowdown multiple may be generated according to the motion vector data and the slowdown multiple, and then movement of the target pixel is performed based on the first sequence of images and the reference motion vector data, so as to generate the insertion image whose quantity matches the slowdown multiple, so as to insert the insertion image into the play sequence of the first sequence of images, and obtain the second sequence of images that includes more images. Therefore, it is no longer necessary to produce, by using a development tool, more images to be inserted into the first sequence of images, thereby reducing production costs.

Figure 15:
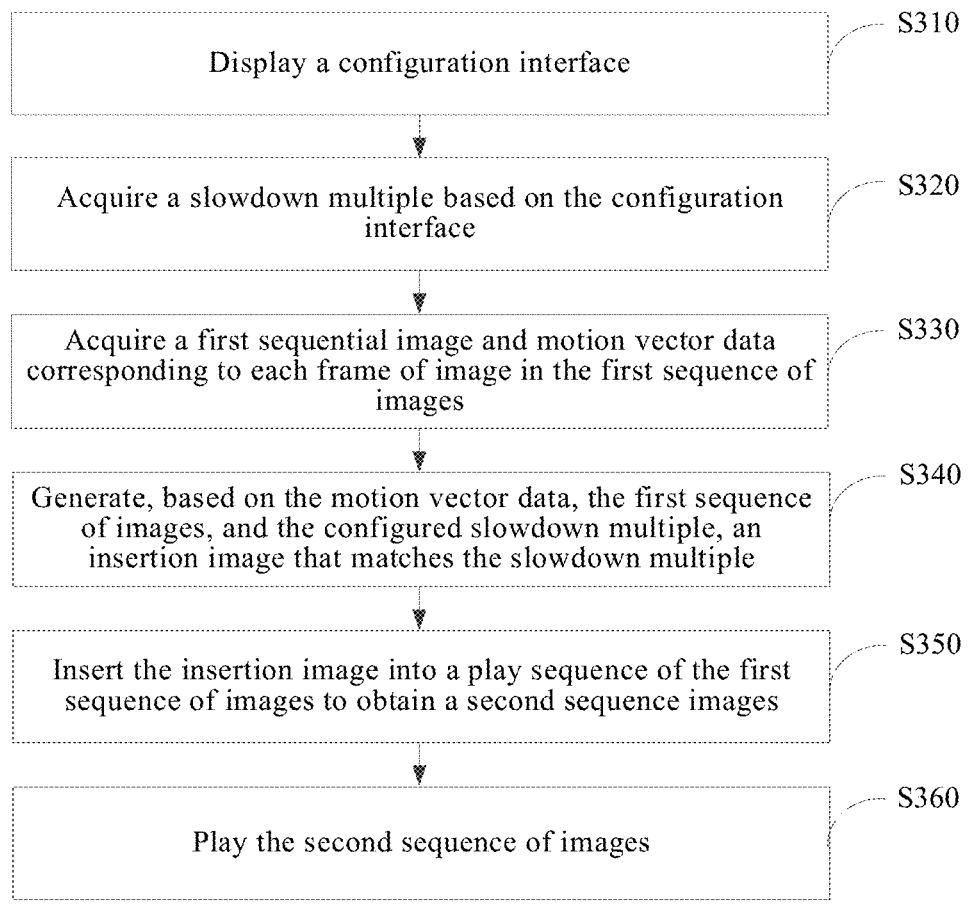
FIG. 15 is a flowchart of an image processing method according to an embodiment of this application.

FIG. 15 is a flowchart of an image processing method applied to a game client according to an embodiment of this application. The method includes the following steps:

S310. Display a configuration interface.

In this embodiment, a slowdown multiple may be pre-configured by a developer in a development phase of a first sequence of images, or may be configured by a user in the game client for displaying a first sequence of images. For example, the image processing method provided in this embodiment may be executed by the game client, and the game client may be configured with a configuration interface. In this case, the game client may display the configuration interface after detecting a trigger operation of the user, so that the user configures a slowdown multiple required by the user.

S320. Acquire a slowdown multiple based on the configuration interface.

In this embodiment, the configuration interface may allow the user to input the slowdown multiple in multiple ways.

In one example, the configuration interface includes a first control and a second control that can slide on the first control, and acquiring a dynamic effect parameter that is entered on the configuration interface includes: acquiring a location of the second control after sliding in response to a touch operation; and using a value corresponding to the location as the slowdown multiple. For example, if the value corresponding to the location is 2, it may be obtained that the slowdown multiple is 2.

Figure 16:
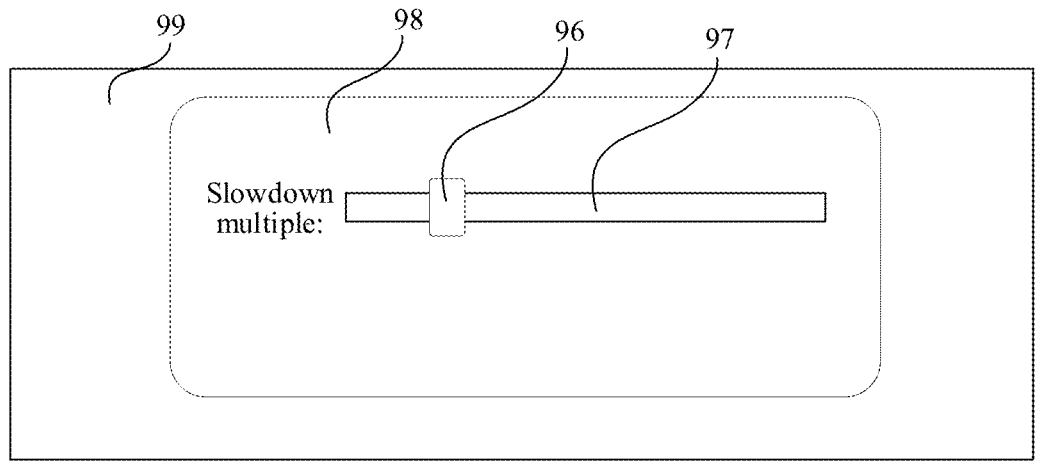
FIG. 16 is a schematic diagram of a configuration interface according to an embodiment of this application.

For example, as shown in FIG. 16, FIG. 16 is a game interface 99 of a game client. In the game interface 99, a configuration interface 98 may be displayed in response to an operation of a user, and a first control 97 and a second control 96 that can slide on the first control 97 are displayed in the configuration interface 98. The user may drag the second control 96 to slide on the first control 97, and different locations on the first control 97 are corresponding to different values. The game client may detect and acquire the location of the second control after sliding in response to the touch operation, and use the value corresponding to the location as the inputted slowdown multiple.

In another example, the game client can directly display an input box and an OK control in the configuration interface, so that the user can manually input the required slowdown multiple in the input box, and then click the OK control. After detecting that the OK control is touched, the game client uses the data acquired from the input box as the slowdown multiple.

An electronic device installed with the game client configures a special file storage area for the game client to store a file corresponding to the game client. In this case, a configuration file corresponding to the game client is correspondingly stored in the file storage area, and the configuration file may record related configuration information of the game client. For example, a configured picture resolution, a configured sound effect, a configured operation method, and correspondingly a slowdown multiple may also be configured. After the slowdown multiple is acquired, the game client may further store the acquired slowdown multiple in the configuration file, so as to update a previously stored slowdown multiple. For example, if the originally stored slowdown multiple in the configuration file is 2, after a newly inputted slowdown multiple is detected, and it is recognized that the newly inputted slowdown multiple is different from 2, for example, 3, the game client updates the slowdown multiple in the configuration file from 2 to 3. In this case, the slowdown multiple stored in the configuration file may be understood as a slowdown multiple used in a process of generating an insertion image.

S330. Acquire a first sequence of images and motion vector data corresponding to each frame of image in the first sequence of images.

S340. Generate, based on the motion vector data, the first sequence of images, and a slowdown multiple, an insertion image that matches the slowdown multiple.

S350. Insert the insertion image into a play sequence of the first sequence of images to obtain a second sequence of images.

S360. Play the second sequence of images.

In this embodiment, S310 and S320 may be separately performed in different phases with S350. It may be understood that the first sequence of images represents a dynamic effect. For example, the first sequence of images represents a dynamic effect in which an object flies from one end to another end. A dynamic effect represented by the second sequence of images is the same as content represented by the first sequence of images, and the difference mainly lies in that play duration of the dynamic effect represented by the second sequence of images is different from that of the dynamic effect represented by the first sequence of images. Then, if the first sequence of images and motion vector data corresponding to each frame of image in the first sequence of images need to be acquired to generate the second sequence of images only when the dynamic effect corresponding to the second sequence of images needs to be loaded for display, the second sequence of images may be displayed with a sense of delay.

It may be understood that each frame of image in the first sequence of images has been produced in advance. However, to perform slowdown play processing, a newly generated insertion image needs to be obtained based on real-time rendering of the first sequence of images. In this rendering process, a processing resource (a computing resource of a CPU or a computing resource of a GPU) of the electronic device in which the game client is located needs to be consumed. If a current processing resource is tight, rendering efficiency of the insertion image is not high, and consequently, the second sequence of images is displayed with a sense of delay.

In one example of improving the problem, when detecting that the slowdown multiple changes, the game client may generate, based on the motion vector data, the first sequence of images, and the slowdown multiple, an insertion image whose quantity matches the slowdown multiple, even if it is not currently in a scene in which the second sequence of images needs to be loaded, so as to generate the second sequence of images, so that the second sequence of images can be directly played when the second sequence of images needs to be displayed, thereby improving real-time playing performance of the dynamic effect.

According to the image processing method provided in this embodiment, in addition to reducing production costs and shortening time for producing the dynamic effect, in this embodiment, the slowdown multiple may be inputted in real time on the configuration interface, so that a play speed of the dynamic effect to be displayed by the first sequence of images is controlled in real time, thereby improving interaction in a dynamic effect display process, and further improving user experience.

Figure 17:
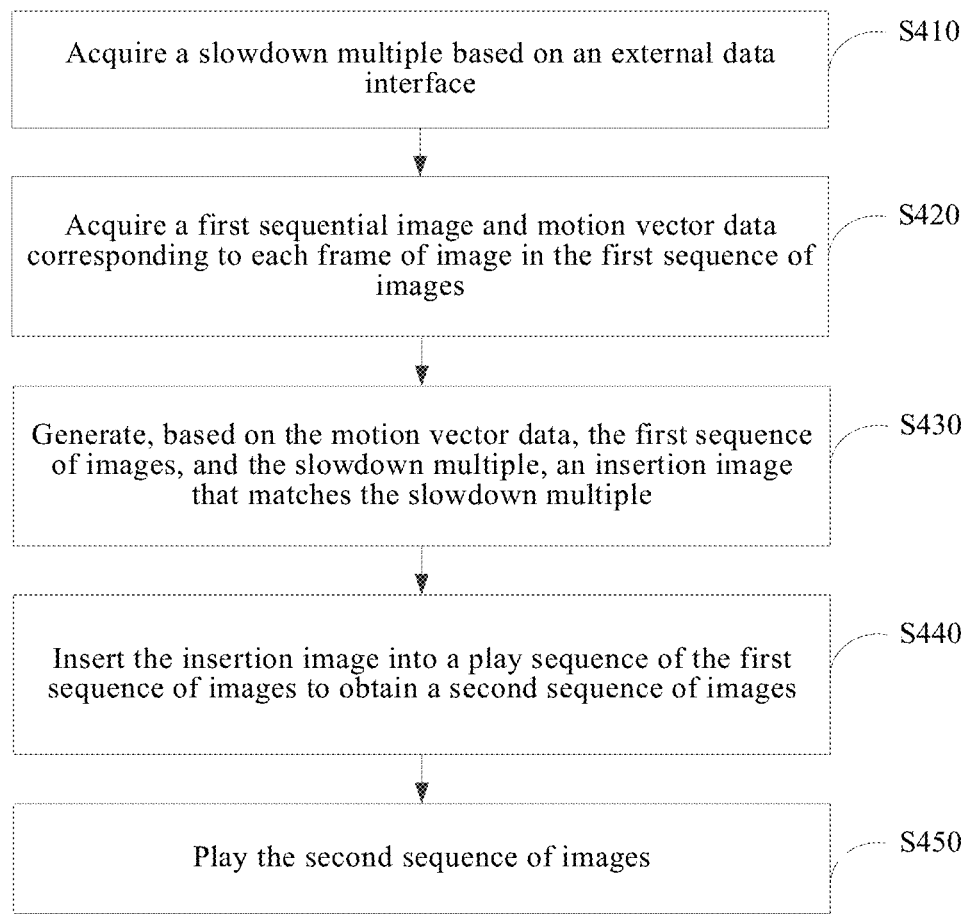
FIG. 17 is a flowchart of an image processing method according to an embodiment of this application.

FIG. 17 is a flowchart of an image processing method applied to a game client according to an embodiment of this application. The method includes the following steps:

S410. Acquire a slowdown multiple based on an external data interface.

Acquiring the slowdown multiple based on the external data interface may be understood as receiving the slowdown multiple transmitted by using the external data interface.

In one example, a plug-in may be running on an electronic device in which the game client is located to configure configuration information of multiple game clients in a centralized manner, so that a user does not need to separately configure the configuration information of the multiple game clients in sequence, thereby reducing operation repetition of the user and improving user experience.

For example, a game client that executes the image processing method provided in this embodiment is a client A. In addition to the client A, a client B and a client C are installed in an electronic device in which a plug-in A is configured. The plug-in A may communicate with the client A, the client B, and the client C in a process communication. In this case, the user can configure a game interface resolution, a game sound effect, a slowdown multiple of a dynamic effect, and the like in the plug-in A. After acquiring the game interface resolution, the game sound effect, and the slowdown multiple of the dynamic effect that are configured by the user, the plug-in A may synchronize the information as configuration information to external data interfaces of the client A, the client B, and the client C in the process communication, so that the client A, the client B, and the client C acquire, by using the respective external data interfaces, the configuration information transmitted by the plug-in A, so as to update configuration information in a configuration file.

S420. Acquire a first sequence of images and motion vector data corresponding to each frame of image in the first sequence of images.

S430. Generate, based on the motion vector data, the first sequence of images, and a slowdown multiple, an insertion image that matches the slowdown multiple.

S440. Insert the insertion image into a play sequence of the first sequence of images to obtain a second sequence of images.

S450. Play the second sequence of images.

According to the image processing method provided in this embodiment, in addition to reducing production costs and shortening time for producing the dynamic effect, in this embodiment, the slowdown multiple may be inputted in real time by using the external data interface corresponding to the game client, so that a play speed of the dynamic effect to be displayed by the first sequence of images can be controlled in real time, thereby improving flexibility of slowdown multiple configuration in a dynamic effect display process, and further improving user experience.

In summary, the image processing method provided in the embodiments of this application may be implemented by a terminal/server alone; or may be implemented by the terminal and the server through cooperation. The following describes a solution in which image processing is implemented by the terminal and the server through cooperation.

The terminal collects a request for slowing down playing the first sequence of images (including the slowdown multiple and the first sequence of images), and sends the request to the server. After receiving the request, the server acquires the first sequence of images and the motion vector data, generates, based on the motion vector data, the first sequence of images, and the slowdown multiple, the insertion image whose quantity matches the slowdown multiple, inserts the insertion image into the play sequence of the first sequence of images to obtain the second sequence of images, and sends the second sequence of images to the terminal, so that the terminal displays the second sequence of images. Therefore, after the first sequence of images is produced, when the dynamic effect represented by the first sequence of images needs to be slowed down and the visual effect needs to be maintained, the insertion image is produced according to the motion vector data corresponding to each frame of image in the first sequence of images, and inserted into the play sequence of the first sequence of images, so as to obtain the second sequence of images that includes more images. In this way, a development tool is not required to be used for producing more images to be inserted into the first sequence of images, so as to reduce production costs and shorten time for producing the dynamic effect, thereby reducing development difficulty and improving development efficiency.

Figure 18:
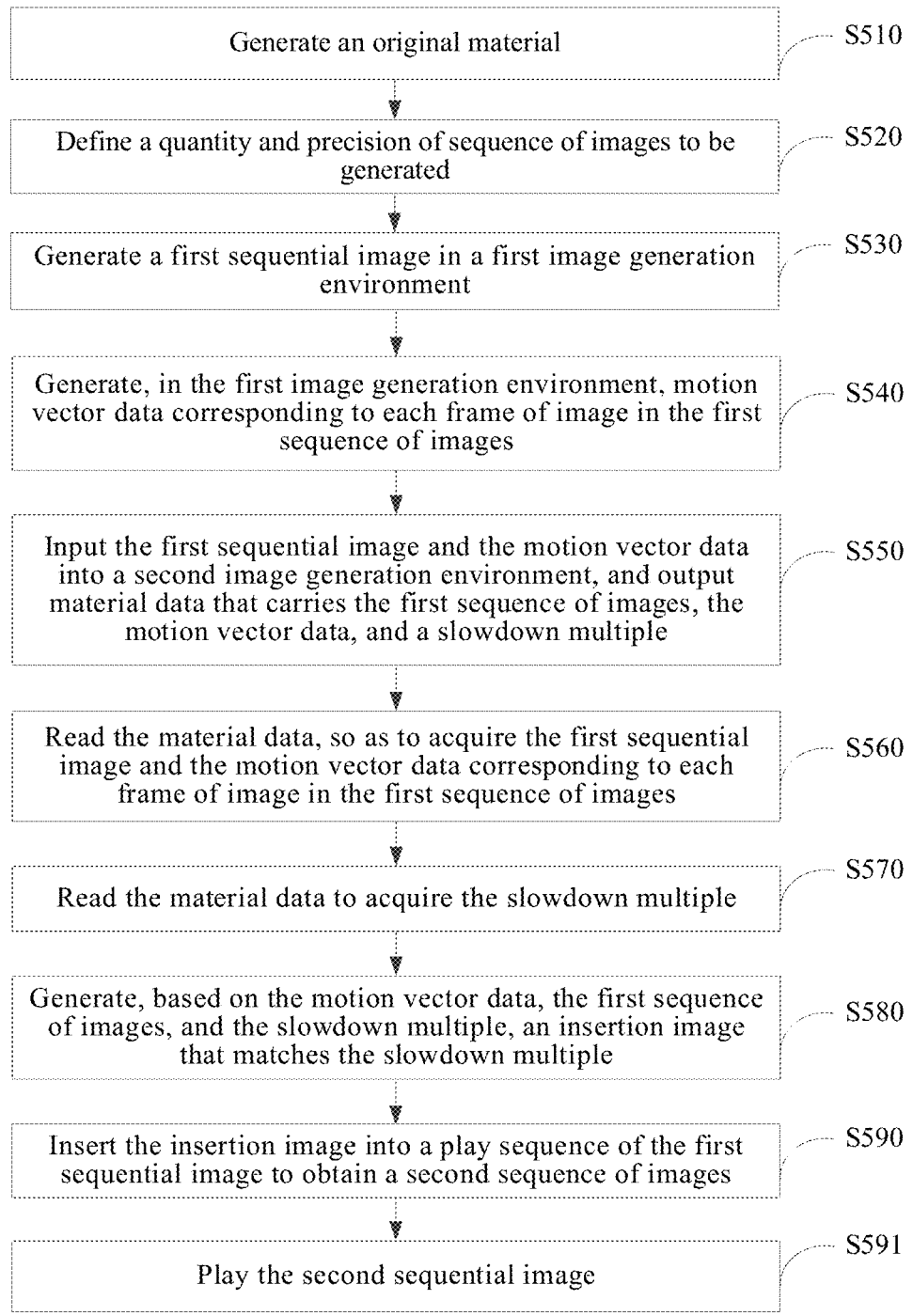
FIG. 18 is a flowchart of an image processing method according to an embodiment of this application.

FIG. 18 is a flowchart of an image processing method according to an embodiment of this application. The method includes the following steps:

S510. Generate an original material.

Before a first sequence of images is generated, a basic sequence of images may be produced in advance as an original material, and then some images are selected from the basic sequence of images as the first sequence of images.

S520. Define the quantity and precision of sequence of images to be generated.

The precision may be understood as a resolution of an image.

For example, in a basic sequence of images with a fixed total pixel included, if more sequence of images are to be obtained based on the basic sequence of images, a resolution of each frame of image in the sequence of images is low. For example, for a basic sequence of images with a total of 2048×2048 pixels, if the basic sequence of images includes an 8×8 sequence of images (64 frames in total), an obtained pixel corresponding to a single frame of image is 256×256. If the basic sequence of images includes a 16×16 sequence of images (256 frames), an obtained pixel corresponding to a single frame of image is 128×128.

In this case, a resolution of a single frame of image may be defined according to a requirement, so as to obtain the quantity of frames of images included in the first sequence of images.

S530. Generate a first sequence of images in a first image generation environment.

S540. Generate, in the first image generation environment, motion vector data corresponding to each frame of image in the first sequence of images.

In this embodiment, S540 may be performed after S530, or may be performed at the same time as S530.

S550. Input the first sequence of images and the motion vector data into a second image generation environment, and output material data that carries the first sequence of images, the motion vector data, and a slowdown multiple.

In one example, a scalar parameter may be configured in the material data to store the slowdown multiple, so as to produce a material template. The scalar parameter may facilitate an external program to identify a parameter for storing the slowdown multiple, and then the slowdown multiple is accessed or modified by using the external program. In addition, a dynamic parameter may be further configured in the material data. The dynamic parameter may be used for invoking the slowdown multiple in a cascade (particle editor) system in the second image generation environment while producing a particle effect.

When a scalar parameter is configured in the material data, a parameter in the scalar parameter about the slowdown multiple may be updated, and the slowdown multiple in the material data is updated, so that a play rhythm of a dynamic effect represented by the first sequence of images is dynamically controlled in real time.

S560. Read the material data, so as to acquire the first sequence of images and the motion vector data corresponding to each frame of image in the first sequence of images.

S570. Read the material data to acquire the slowdown multiple.

S580. Generate, based on the motion vector data, the first sequence of images, and the slowdown multiple, an insertion image that matches the slowdown multiple.

S590. Insert the insertion image into a play sequence of the first sequence of images to obtain a second sequence of images.

S591. Play the second sequence of images.

The following further describes, by using the accompanying drawings, the image processing method provided in this embodiment to process a dynamic effect in a game scene to obtain a dynamic effect of a super slow motion type.

Figure 19:
FIG. 19 is a schematic diagram of an explosion effect in a game scene according to an embodiment of this application.

FIG. 19 shows a game scene of an instant combat-type game, and an explosion effect after a bomb is thrown out is played in the game scene (a location indicated by an arrow in the figure).

For example, in an explosion effect of a common type, a frame rate is generally lower than a frame rate of an explosion effect of a super slow action type, which means that the explosion effect of the common type is completed in a very short time. However, the explosion effect of the super slow action type has longer play duration, so that the whole explosion effect changes gently.

Figure 20:
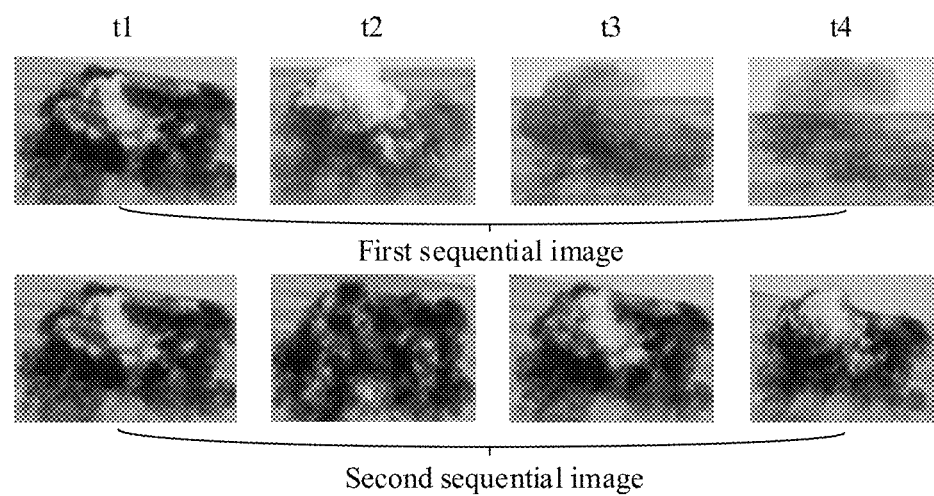
FIG. 20 is a schematic diagram of effect comparison before and after explosion effect processing in a game scene according to an embodiment of this application.

As shown in FIG. 20, images in the upper row in FIG. 20 are a first sequence of images that represents an explosion effect of a common type, and images in the lower row are a part of a second sequence of images that is obtained through processing by using the image processing method provided in the embodiments of this application. For example, an image corresponding to a moment t1 and an image corresponding to a moment t2 in the upper row of images may be used as an interval, and then an insertion image in this interval is obtained based on the solution provided in the foregoing embodiment. Similarly, an insertion image in an interval between the image corresponding to the moment t2 and an image corresponding to a moment t3 and an insertion image in an interval between the image corresponding to the moment t3 and an image corresponding to a moment t4 may be obtained, so that a second sequence of images that represents an explosion effect of a super slow action type is obtained.

The upper row shows effect images of the explosion effect of the common type at moments t1, t2, t3, and t4 after the explosion starts, and the lower row shows effect images of the explosion effect of the super slow action type at moments t1, t2, t3, and t4 after the explosion starts. It may be seen from FIG. 20 that the explosion effect of the common type represented by the first sequence of images is about to end when it is played to the moment t4, and the explosion effect of the super slow action type represented by the second sequence of images at the moment t1 is still not significantly different from the explosion effect of the super slow action type at the moment t4. In this case, the explosion effect of the super slow action type may undergo transformation of more frames of images after the moment t4 before changing to the image of the explosion effect of the common type at the moment t4 in the upper row, so that the whole explosion effect changes more smoothly. The more frames of images may include the insertion image acquired based on the solution provided in the embodiments of this application.

Figure 21:
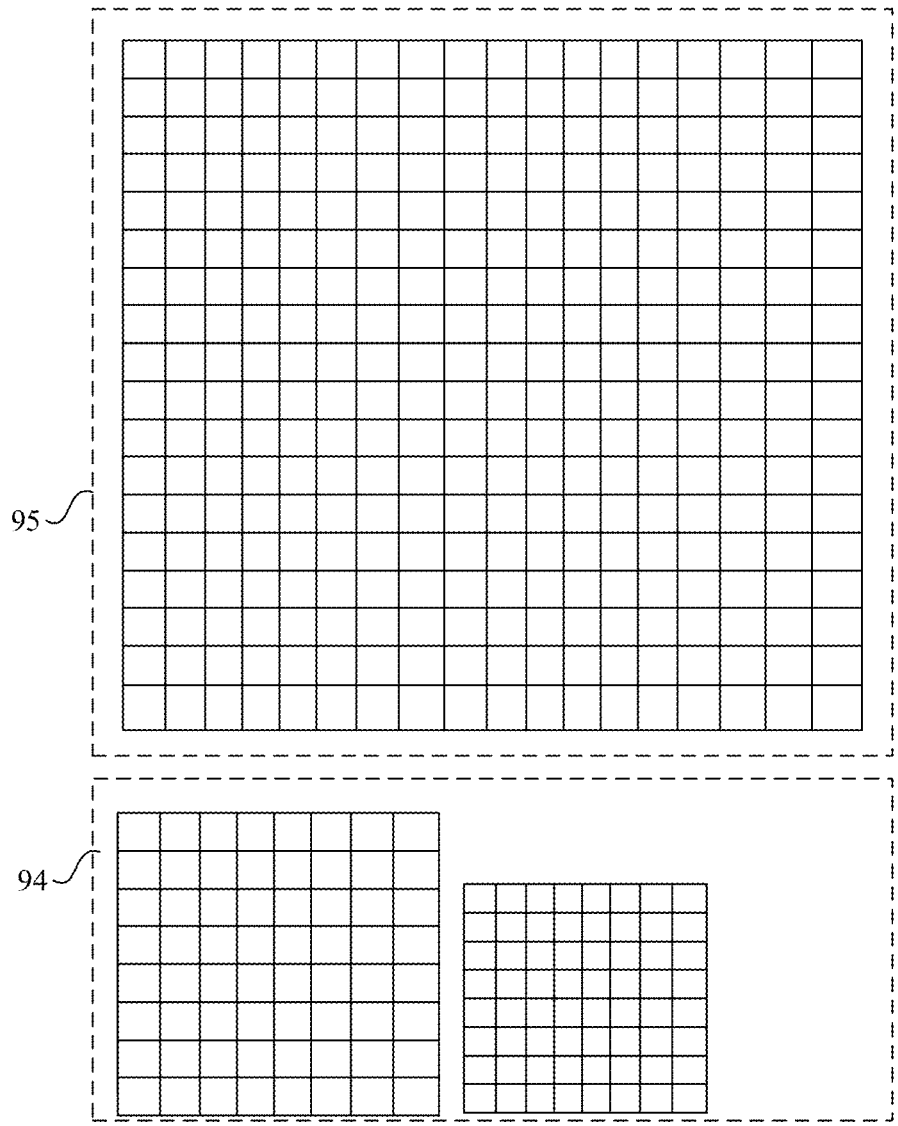
FIG. 21 is a comparison effect diagram of the quantity of images that need to be produced in an image processing method according to an embodiment of this application and a related technology.

As shown in FIG. 21, if a first sequence of images includes 64 frames of images (each small grid represents one frame of image), FIG. 21 shows a comparison effect between the quantity of images that need to be produced by using the solution provided in the embodiments of this application and the quantity of images that need to be produced in a related technology when a slowdown multiple is 5. A dashed line box 94 shows the quantity of images that need to be correspondingly produced by using the solution provided in the embodiments of this application. Because the insertion image in the solution provided in the embodiments of this application is generated through calculation by using motion vector data, no more images need to be produced by using a development tool. Therefore, a visual effect of slowing down by 5 times can be implemented by using only 64 frames of images included in the first sequence of images that is originally produced by using the development tool and a map (also 64 frames) corresponding to each frame of image in the first sequence of images. A dashed line box 95 shows the quantity of images that need to be produced in the related technology in a case of a slowdown multiple 5. Because all frames of images in the related technology need to be produced by using the development tool, the quantity of frames that need to be produced in a case of slowing down by 5 times is obviously more than the quantity of images in the dashed line box 94.

In this embodiment, in one example, S510 to S590 may be performed by a computer on which a first image generation environment and a second image generation environment are installed, and S591 may be performed by a game client.

For example, when the dynamic effect needs to be loaded, the game client may start to read material data to acquire a first sequence of images and motion vector data corresponding to each frame of image in the first sequence of images. For example, the dynamic effect represented by the first sequence of images is an explosion effect of a bomb in a game scene. When the game client needs to display the explosion effect, the game client may read material data corresponding to the explosion effect to acquire the first sequence of images corresponding to the explosion effect and the motion vector data corresponding to each frame of image in the first sequence of images.

For example, during startup, the game client may start to acquire the first sequence of images and the motion vector data corresponding to each frame of image in the first sequence of images, thereby further improving display efficiency of a second sequence of images, so that the second sequence of images can be displayed more immediately, thereby reducing a display delay of the dynamic effect. For example, an explosion effect of a bomb represented by the first sequence of images is used. The explosion effect is triggered only after a bomb is thrown out by a game player. To facilitate display of the explosion effect without delay, the game client may start to acquire the first sequence of images and the motion vector data corresponding to each frame of image in the first sequence of images at a resource loading stage in a startup process or a user login stage, so as to generate, based on the motion vector data, the first sequence of images, and a slowdown multiple, an insertion image whose quantity matches the slowdown multiple, so as to complete generation of the second sequence of images before entering a scene in which the dynamic effect needs to be played.

In another implementation, S510 to S550 may be performed by the computer in which the first image generation environment and the second image generation environment are installed, S560 to S580 may be performed by a server, and S591 may be performed by the game client. Accordingly, generated material data may be pre-stored in the server. When the game client needs to play a dynamic effect corresponding to the second sequence of images, the server reads the material data to acquire the motion vector data, the first sequence of images, and the slowdown multiple to generate an insertion image whose quantity matches the slowdown multiple, and then inserts the insertion image into a play sequence of the first sequence of images to obtain the second sequence of images, and then the server sends the second sequence of images to the game client, so that the game client displays the second sequence of images.

When S591 is performed, the second sequence of images may be displayed by a client that generates the second sequence of images, or may be sent by the client that generates the second sequence of images to a target client, and the target client displays the second sequence of images. For example, if there is an electronic device A and an electronic device B in the same local area network, and the same game client is installed in the electronic device A and the electronic device B, after the game client in the electronic device A first triggers a game scene and generates a second sequence of images corresponding to a dynamic effect A in the game scene, the electronic device A may send the generated second sequence of images to the game client of the electronic device B for storage. In this case, when the game client in the electronic device B enters the game scene later and needs to load the dynamic effect A, the second sequence of images sent by the electronic device A may be directly read, so that the game client in the electronic device B does not repeatedly generate the second sequence of images.

According to the image processing method provided in this embodiment, after the first sequence of images is produced, when the dynamic effect represented by the first sequence of images needs to be slowed down and the visual effect needs to be maintained, the insertion image may be produced according to the motion vector data corresponding to each frame of image in the first sequence of images, and inserted into the play sequence of the first sequence of images, to obtain the second sequence of images that includes more images. Therefore, it is no longer necessary to produce, by using a development tool, more images to be inserted into the first sequence of images, thereby reducing production costs. In addition, in this embodiment, the slowdown multiple, the first sequence of images, and the motion vector data may be configured in the generated material data, and subsequently, the first sequence of images, the motion vector data, and the slowdown multiple may be collectively acquired by reading the material data, thereby improving efficiency of acquiring the dynamic data.

Figure 22:
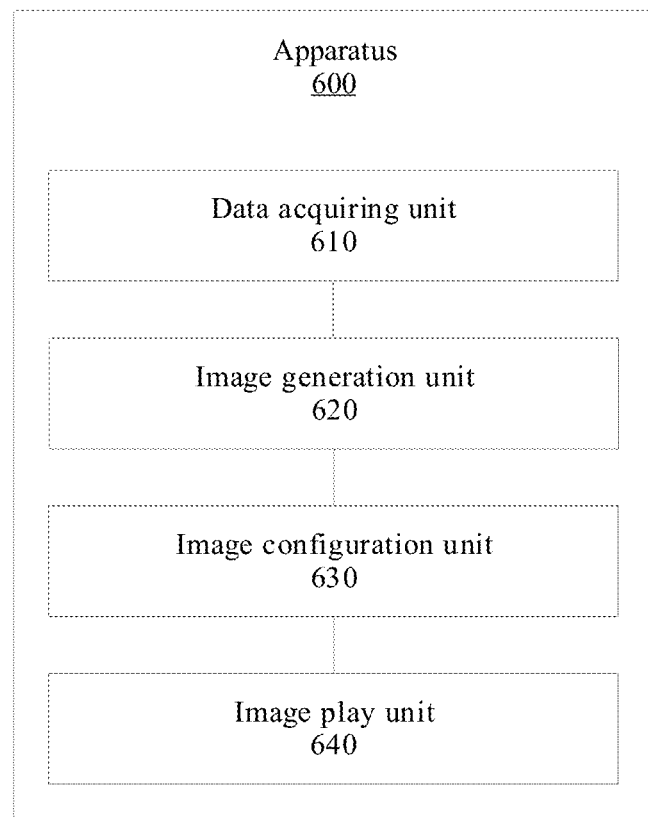
FIG. 22 is a structural block diagram of an image processing apparatus according to an embodiment of this application.

Referring to FIG. 22, an embodiment of this application provides an image processing apparatus 600, and the apparatus 600 includes:

a data acquiring unit 610, configured to acquire a first sequence of images and motion vector data corresponding to each frame of image in the first sequence of images;

an image generation unit 620, configured to generate, based on the motion vector data, the first sequence of images, and a slowdown multiple, an insertion image that matches the slowdown multiple, a quantity of insertion images corresponding to the slowdown multiple;

an image configuration unit 630, configured to insert the insertion image into a play sequence of the first sequence of images to obtain a second sequence of images; and an image play unit 640, configured to play the second sequence of images.

According to the image processing apparatus provided in this embodiment, after the first sequence of images and the motion vector data are acquired, the insertion image whose quantity matches the slowdown multiple is generated based on the motion vector data, the first sequence of images, and the slowdown multiple, and the insertion image is inserted into the play sequence of the first sequence of images to obtain the second sequence of images. Therefore, after the first sequence of images is produced, when the dynamic effect represented by the first sequence of images needs to be slowed down and the visual effect needs to be maintained, the insertion image is produced according to the motion vector data corresponding to each frame of image in the first sequence of images, and inserted into the play sequence of the first sequence of images, so as to obtain the second sequence of images that includes more images. In this way, a development tool is not required to be used for producing more images to be inserted into the first sequence of images, so as to reduce production costs.

Figure 23:
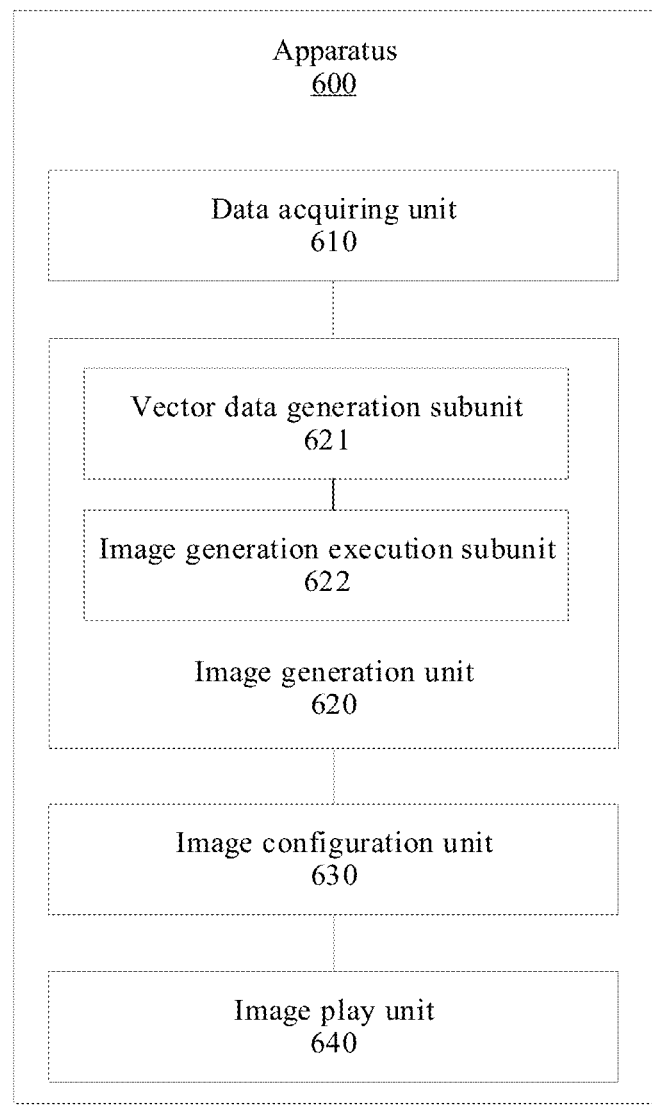
FIG. 23 is a structural block diagram of an image processing apparatus according to an embodiment of this application.

In one example, as shown in FIG. 23, the image generation unit 620 includes: a vector data generation subunit 621, configured to generate, based on the motion vector data and the slowdown multiple, reference motion vector data that matches the slowdown multiple, a quantity of reference motion vector data corresponding to the slowdown multiple; and an image generation execution subunit 622, configured to generate, based on the first sequence of images and the reference motion vector data, the insertion image that matches the slowdown multiple.

Accordingly, the vector data generation subunit 621 is further configured to acquire a target displacement, the target displacement being a displacement represented by motion vector data corresponding to a later displayed image, and the later displayed image being an image with a later play order in every two adjacent images in the first sequence of images; acquire a ratio of the target displacement to the slowdown multiple; obtain a quantity of insertion images between every two adjacent images based on the slowdown multiple; and use the ratio as reference motion vector data corresponding to the insertion image between every two adjacent images, and use the reference motion vector data corresponding to the insertion image as the reference motion vector data that matches the slowdown multiple.

The image generation execution subunit 622 is further configured to: acquire a target image corresponding to current reference motion vector data in a process of generating an insertion image corresponding to the current reference motion vector data, the target image being an image corresponding to an initial location of a target pixel corresponding to the current reference motion vector data; move a target pixel in a target image corresponding to each piece of reference motion vector data according to reference motion vector data corresponding to the target pixel, to obtain an insertion image corresponding to each piece of current reference motion vector data; and use a set of insertion images corresponding to the current reference motion vector data as the insertion image that matches the slowdown multiple.

Figure 24:
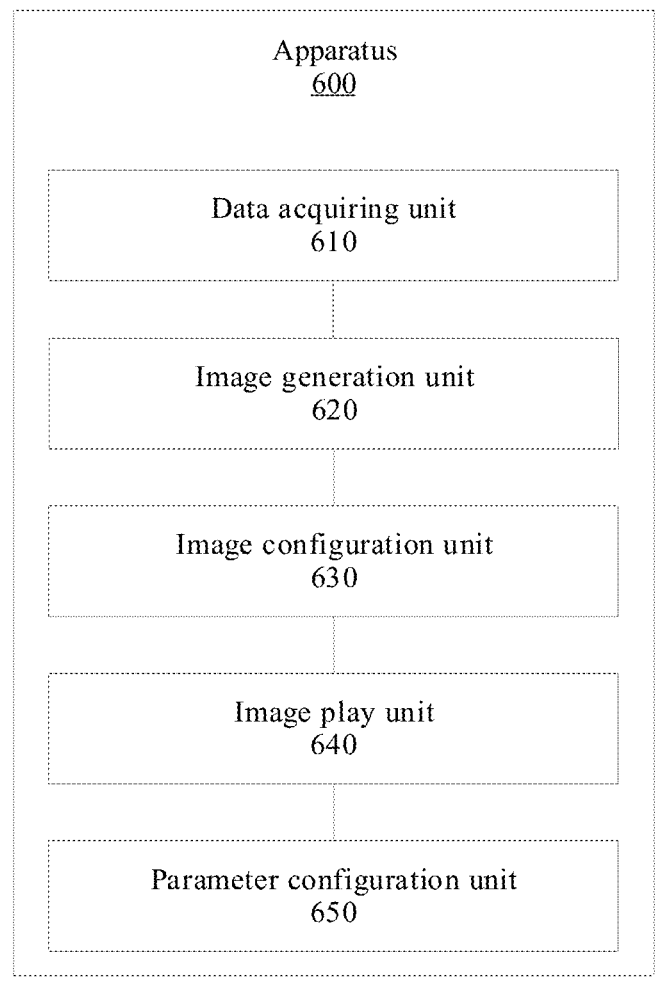
FIG. 24 is a structural block diagram of an image processing apparatus according to an embodiment of this application.

In one example, as shown in FIG. 24, the apparatus 600 further includes a parameter configuration unit 650, configured to display a configuration interface; acquire a slowdown multiple inputted in the configuration interface; and use the inputted slowdown multiple as the slowdown multiple. For example, the configuration interface includes a first control and a second control that can slide on the first control. In this case, the parameter configuration unit 650 is further configured to acquire a location of the second control after sliding in response to a touch operation; and use a slowdown multiple corresponding to the location as the inputted slowdown multiple.

In another example, the parameter configuration unit 650 is further configured to acquire a slowdown multiple that is inputted by an external application program by using an external data interface; and use the transmitted slowdown multiple as the slowdown multiple.

Figure 25:
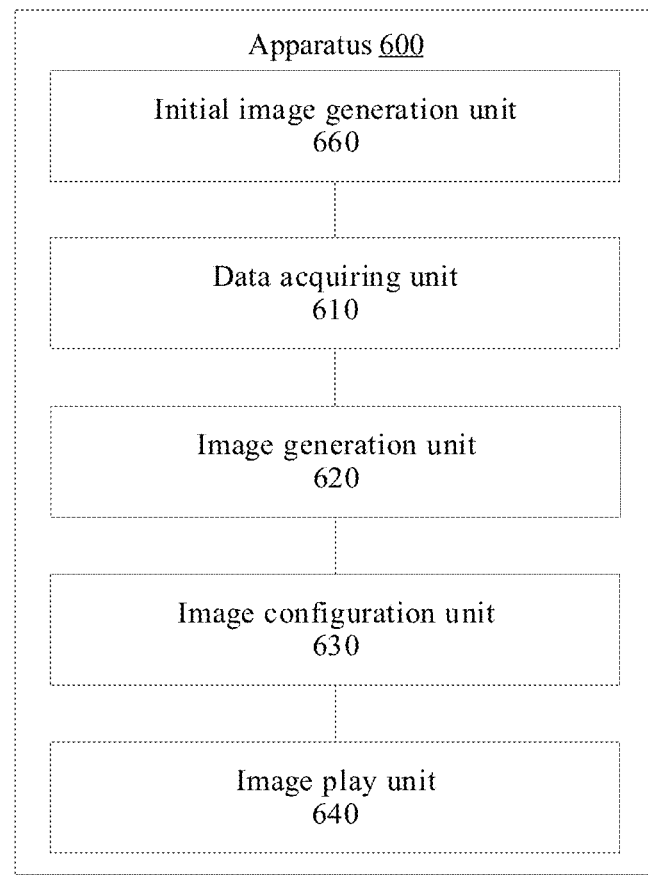
FIG. 25 is a structural block diagram of an image processing apparatus according to an embodiment of this application.

In one example, as shown in FIG. 25, the apparatus 600 further includes an initial image generation unit 660, configured to generate the first sequence of images in a first image generation environment; generate, in the first image generation environment, motion vector data corresponding to each frame of image in the first sequence of images; and input the first sequence of images and the motion vector data into a second image generation environment, and output material data that carries the first sequence of images, the motion vector data, and the slowdown multiple. Accordingly, the data acquiring unit 610 is further configured to read the material data, so as to acquire the first sequence of images and the motion vector data corresponding to each frame of image in the first sequence of images, and read the material data to acquire the slowdown multiple.

The apparatus embodiments in this application correspond to the foregoing method embodiments. For a specific principle in the apparatus embodiments, refer to the content in the foregoing method embodiments. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 26:
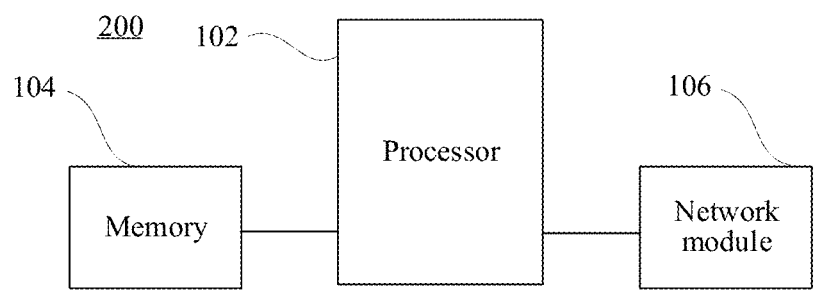
FIG. 26 is a structural block diagram of an electronic device according to this application used for performing an image processing method according to an embodiment of this application.

The following describes an electronic device provided in this application with reference to FIG. 26.

Referring to FIG. 26, based on the foregoing image processing method, an embodiment of this application further provides an electronic device 200 that can perform the foregoing image processing method. The electronic device 200 includes: a processor 102, a memory 104, and a network module 106. The memory 104 stores a program that can perform the content in the foregoing embodiment, and the processor 102 can execute the program stored in the memory 104.

The processor 102 may include one or more cores used for processing data, and message matrix units. The processor 102 connects parts of the entire electronic device 200 by using various interfaces and lines, and performs various functions of the electronic device 200 and processes data by operating or executing an instruction, a program, a code set or an instruction set stored in the memory 104 and invoking the data stored in the memory 104. Optionally, the processor 102 may be implemented by using at least one hardware form of a digital signal processor (DSP), a field-programmable gate array (FPGA), and a programmable logic array (PLA). The processor 102 may be integrated with one or a combination of a central processing unit (CPU), a graphics processing unit (GPU), a modem, and the like. The CPU mainly processes an operating system, a user interface, an application program, and the like. The GPU is configured to render and draw display content. The modem is configured to process wireless communication. The modem processor may alternatively not be integrated in the processor 102, but may be independently implemented by a communication chip.

The memory 104 may include a random access memory (RAM), or may include a read only memory (ROM). The memory 104 may be configured to store instructions, programs, code, code sets, or instruction sets. The memory 104 may include a program storage area and a data storage area. The program storage area may store an instruction used for implementing an operating system, an instruction used for implementing at least one function (for example, a touch function, a sound playback function, and an image playback function), an instruction used for implementing the following method embodiments, or the like. The data storage area may further store data (such as an address book, audio and video data, and chat record data) created by the terminal 100 in use.

The network module 106 is configured to receive and send an electromagnetic wave, and implement mutual conversion between the electromagnetic wave and an electric signal, so as to communicate with a communication network or another device, for example, an audio playback device. The network module 106 may include various existing circuit elements for performing these functions, such as an antenna, an RF transceiver, a digital signal processor, a cipher/decipher chip, a subscriber identity module (SIM) card, and a memory. The network module 106 may communicate with various networks such as the Internet, an intranet and a wireless network, or communicate with other devices through a wireless network. The wireless network may include a cellular telephone network, a wireless local area network, or a metropolitan area network. For example, the network module 106 may exchange information with a base station.

Figure 27:
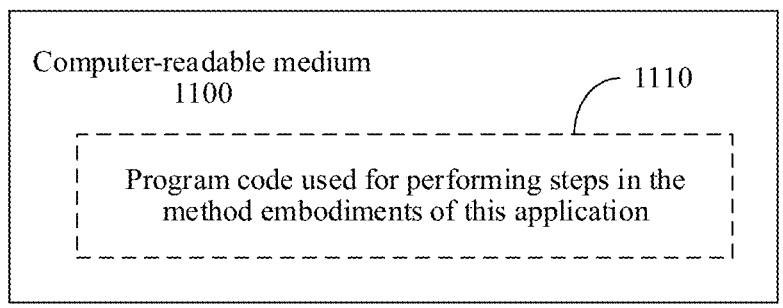
FIG. 27 shows a storage unit that is used for storing or carry program code for implementing an image processing method according to an embodiment of this application.

FIG. 27 shows a schematic block diagram of a computer-readable storage medium according to an embodiment of this application. A computer-readable medium 1100 stores program code, which may be invoked by a processor to perform the method described in the foregoing method embodiments.

The computer-readable medium 1100 may be an electronic memory such as a flash memory, an electrically erasable programmable read-only memory (EEPROM), an EPROM, a hard disk or a ROM. Optionally, the computer-readable storage medium 1100 includes a non-transitory computer-readable storage medium. The computer-readable storage medium 1100 has storage space of program code 1110 for performing any method step in the foregoing method. The program code may be read from one or more computer program products or be written to the one or more computer program products. For example, the program code 1110 may be compressed in an appropriate form.

In conclusion, according to the image processing method and apparatus, the electronic device, and the storage medium that are provided in this application, after the first sequence of images and the motion vector data are acquired, the insertion image whose quantity matches the slowdown multiple is generated based on the motion vector data, the first sequence of images, and the slowdown multiple, and the insertion image is inserted into the play sequence of the first sequence of images to obtain the second sequence of images. Therefore, after the first sequence of images is produced, when the dynamic effect represented by the first sequence of images needs to be slowed down and the visual effect needs to be maintained, the insertion image is produced according to the motion vector data corresponding to each frame of image in the first sequence of images, and inserted into the play sequence of the first sequence of images, so as to obtain the second sequence of images that includes more images. In this way, a development tool is not required to be used for producing more images to be inserted into the first sequence of images, so as to reduce production costs and shorten time for producing the dynamic effect.

In addition, because the quantity of images that need to be produced by using the development tool in the previous production process is reduced, memory space that needs to be occupied is also reduced, and utilization of storage space is improved.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

Finally, the foregoing embodiments are merely used for describing the technical solutions of this application, but are not intended to limit this application. Although this application is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this application.

What is claimed is:

1. An image processing method, performed by an electronic device, the method comprising:
   acquiring a first sequence of images and motion vector data corresponding to each frame of image in the first sequence of images;
   generating, based on the motion vector data, the first sequence of images, and a slowdown multiple, an insertion image that corresponds to the slowdown multiple, a quantity of insertion images corresponding to the slowdown multiple, comprising:
   acquiring a target displacement representing motion vector data corresponding to a later displayed image, the later displayed image being an image with a later play order in every two adjacent images in the first sequence of images;
   acquiring a ratio of the target displacement to the slowdown multiple; and
   obtaining a quantity of insertion images between every two adjacent images based on the slowdown multiple and the ratio, wherein the quantity is a maximum integer that makes a product of the quantity and the ratio less than the target displacement;
   inserting the insertion image into a play sequence of the first sequence of images to obtain a second sequence of images; and
   playing the second sequence of images.

2. The method according to claim 1, wherein the generating, based on the motion vector data, the first sequence of images, and a slowdown multiple, an insertion image that corresponds to the slowdown multiple comprises:
   generating, based on the motion vector data and the slowdown multiple, reference motion vector data that corresponds to the slowdown multiple, a quantity of reference motion vector data corresponding to the slowdown multiple; and
   generating, based on the first sequence of images and the reference motion vector data, the insertion image that corresponds to the slowdown multiple.

3. The method according to claim 2, wherein the generating, based on the motion vector data and the slowdown multiple, reference motion vector data that corresponds to the slowdown multiple comprises:
   using the ratio as reference motion vector data corresponding to the insertion image between every two adjacent images, and using the reference motion vector data corresponding to the insertion image as the reference motion vector data that corresponds to the slowdown multiple.

4. The method according to claim 2, wherein the generating, based on the first sequence of images and the reference motion vector data, the insertion image that corresponds to the slowdown multiple comprises:
   acquiring a target image corresponding to current reference motion vector data in a process of generating an insertion image corresponding to the current reference motion vector data, the target image being an image corresponding to an initial location of a target pixel corresponding to the current reference motion vector data;

moving a target pixel in a target image corresponding to each piece of current reference motion vector data according to reference motion vector data corresponding to the target pixel, to obtain an insertion image corresponding to each piece of current reference motion vector data; and using a set of insertion images corresponding to the current reference motion vector data as the insertion image that corresponds to the slowdown multiple.

5. The method according to claim 1, wherein before the generating, based on the motion vector data, the first sequence of images, and a slowdown multiple, an insertion image that corresponds to the slowdown multiple, the method further comprises:

displaying a configuration interface; and acquiring the slowdown multiple based on the configuration interface.

6. The method according to claim 5, wherein the configuration interface comprises a first control and a second control that slides relative to the first control; and the acquiring the slowdown multiple based on the configuration interface comprises:

acquiring a location of the second control after sliding in response to a touch operation; and using a value corresponding to the location as the slowdown multiple.

7. The method according to claim 1, wherein before the generating, based on the motion vector data, the first sequence of images, and a slowdown multiple, an insertion image that corresponds to the slowdown multiple, the method further comprises:

acquiring the slowdown multiple based on an external data interface.

8. The method according to claim 1, wherein the motion vector data is a motion vector carried in a map whose image content corresponds to the first sequence of images, and a value of a specified color channel of each pixel in the map represents a motion vector of a corresponding pixel in the first sequence of images.

9. An image processing apparatus, comprising at least one processor and at least one memory, one or more programs being stored in the at least one memory and configured to be executed by the at least one processor to:

acquire a first sequence of images and motion vector data corresponding to each frame of image in the first sequence of images;

generate, based on the motion vector data, the first sequence of images, and a slowdown multiple, an insertion image that corresponds to the slowdown multiple, a quantity of insertion images corresponding to the slowdown multiple, comprising:

acquiring a target displacement representing motion vector data corresponding to a later displayed image, the later displayed image being an image with a later play order in every two adjacent images in the first sequence of images;

acquiring a ratio of the target displacement to the slowdown multiple; and obtaining a quantity of insertion images between every two adjacent images based on the slowdown multiple and the ratio, wherein the quantity is a maximum integer that makes a product of the quantity and the ratio less than the target displacement;

insert the insertion image into a play sequence of the first sequence of images to obtain a second sequence of images; and play the second sequence of images.

10. The apparatus according to claim 9, wherein the at least one processor is further configured to:

generate, based on the motion vector data and the slowdown multiple, reference motion vector data that corresponds to the slowdown multiple, a quantity of reference motion vector data corresponding to the slowdown multiple; and generate, based on the first sequence of images and the reference motion vector data, the insertion image that corresponds to the slowdown multiple.

11. The apparatus according to claim 10, wherein the at least one processor is further configured to use the ratio as reference motion vector data corresponding to the insertion image between every two adjacent images, and use the reference motion vector data corresponding to the insertion image as the reference motion vector data that corresponds to the slowdown multiple.

12. The apparatus according to claim 10, wherein the at least one processor is further configured to:

acquire a target image corresponding to current reference motion vector data in a process of generating an insertion image corresponding to the current reference motion vector data, the target image being an image corresponding to an initial location of a target pixel corresponding to the current reference motion vector data;

move a target pixel in a target image corresponding to each piece of current reference motion vector data according to reference motion vector data corresponding to the target pixel, to obtain an insertion image corresponding to each piece of current reference motion vector data; and use a set of insertion images corresponding to the current reference motion vector data as the insertion image that corresponds to the slowdown multiple.

13. The apparatus according to claim 9, wherein the at least one processor is further configured to display a configuration interface; and acquire the slowdown multiple based on the configuration interface.

14. A non-transitory computer-readable storage medium, storing program code, the program code, when run by at least one processor, causing the at least one processor to perform:

acquiring a first sequence of images and motion vector data corresponding to each frame of image in the first sequence of images;

generating, based on the motion vector data, the first sequence of images, and a slowdown multiple, an insertion image that corresponds to the slowdown multiple, a quantity of insertion images corresponding to the slowdown multiple, comprising:

acquiring a target displacement representing motion vector data corresponding to a later displayed image, the later displayed image being an image with a later play order in every two adjacent images in the first sequence of images;

acquiring a ratio of the target displacement to the slowdown multiple; and obtaining a quantity of insertion images between every two adjacent images based on the slowdown multiple and the ratio, wherein the quantity is a maximum integer that makes a product of the quantity and the ratio less than the target displacement;

inserting the insertion image into a play sequence of the first sequence of images to obtain a second sequence of images; and playing the second sequence of images.

15. The computer-readable storage medium according to claim 14, wherein the generating, based on the motion vector data, the first sequence of images, and a slowdown multiple, an insertion image that corresponds to the slowdown multiple comprises:

generating, based on the motion vector data and the slowdown multiple, reference motion vector data that corresponds to the slowdown multiple, a quantity of reference motion vector data corresponding to the slowdown multiple; and generating, based on the first sequence of images and the reference motion vector data, the insertion image that corresponds to the slowdown multiple.

16. The computer-readable storage medium according to claim 15, wherein the generating, based on the motion vector data and the slowdown multiple, reference motion vector data that corresponds to the slowdown multiple comprises:

using the ratio as reference motion vector data corresponding to the insertion image between every two adjacent images, and using the reference motion vector data corresponding to the insertion image as the reference motion vector data that corresponds to the slowdown multiple.

17. The computer-readable storage medium according to claim 15, wherein the generating, based on the first sequence of images and the reference motion vector data, the insertion image that corresponds to the slowdown multiple comprises:

acquiring a target image corresponding to current reference motion vector data in a process of generating an insertion image corresponding to the current reference motion vector data, the target image being an image corresponding to an initial location of a target pixel corresponding to the current reference motion vector data;

moving a target pixel in a target image corresponding to each piece of current reference motion vector data according to reference motion vector data corresponding to the target pixel, to obtain an insertion image corresponding to each piece of current reference motion vector data; and using a set of insertion images corresponding to the current reference motion vector data as the insertion image that corresponds to the slowdown multiple.

18. The computer-readable storage medium according to claim 14, wherein before the generating, based on the motion vector data, the first sequence of images, and a slowdown multiple, an insertion image that corresponds to the slowdown multiple, the method further comprises:

displaying a configuration interface; and acquiring the slowdown multiple based on the configuration interface.

19. The computer-readable storage medium according to claim 18, wherein the configuration interface comprises a first control and a second control that slides relative to the first control; and the acquiring the slowdown multiple based on the configuration interface comprises:

acquiring a location of the second control after sliding in response to a touch operation; and using a value corresponding to the location as the slowdown multiple.

20. The computer-readable storage medium according to claim 14, wherein before the generating, based on the motion vector data, the first sequence of images, and a slowdown multiple, an insertion image that corresponds to the slowdown multiple, the method further comprises:

acquiring the slowdown multiple based on an external data interface.

* * * * *